(12) United States Patent
Beishline et al.

(10) Patent No.: US 6,736,233 B2
(45) Date of Patent: May 18, 2004

(54) ELECTRO-MECHANICAL ACTUATOR FOR AN ADJUSTABLE PEDAL SYSTEM

(75) Inventors: Eric Beishline, Marlborough, MA (US); Tom Schregardus, Somerville, MA (US); Kevin Hughes, Somerville, MA (US); Jeff Finkelstein, Charlotte, VT (US); Andrew Mark Oakes, Duxbury, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 39 days.

(21) Appl. No.: 10/061,940

(22) Filed: Feb. 1, 2002

(65) Prior Publication Data

US 2002/0134611 A1 Sep. 26, 2002

Related U.S. Application Data

(60) Provisional application No. 60/275,991, filed on Mar. 15, 2001, and provisional application No. 60/266,166, filed on Feb. 2, 2001.

(51) Int. Cl.$^7$ .............................................. B60K 20/04
(52) U.S. Cl. ..................... 180/334; 74/84 R; 74/513; 74/594.7
(58) Field of Search ................... 180/315, 334; 74/820, 84 R, 112, 473.16, 473.17, 478, 512, 513, 560, 594.1, 594.3, 594.4, 594.7

(56) References Cited

U.S. PATENT DOCUMENTS

| 5,605,072 A | * | 2/1997 | Schmidt et al. ............... 74/112 |
| 6,189,409 B1 | * | 2/2001 | Neag et al. .................... 74/512 |

FOREIGN PATENT DOCUMENTS

| DE | 3331597 | * | 3/1985 | .................. 74/513 |
| FR | 1283644 | * | 12/1961 | ..................... 74/84 |
| GB | 2184487 | * | 6/1987 | .................. 74/513 |
| JP | 2-116911 | * | 5/1990 | ................ 74/594.3 |

* cited by examiner

Primary Examiner—Eric Culbreth
(74) Attorney, Agent, or Firm—Grossman, Tucker, Perreault & Pfleger, PLLC

(57) ABSTRACT

An actuator including a motor having a drive shaft, and a gear train coupled to the drive shaft, wherein the gear train includes a plurality of output gears and an associated plurality of output ports for providing a mechanical output from the actuator. The gear train may be provided in a variety of configurations, and may include a worm gear and worm wheel configuration for reducing audible noise. Position sensing may be provided for determining the position of a movable element, e.g. one or more adjustable pedals of an adjustable pedal system. A controller may control the position of the movable element in response to a user input, and may facilitate auto-calibration of the element upon installation. Various configurations for isolating actuator components for reducing audible noise, including a sub-frame isolation configuration, are also provided.

46 Claims, 22 Drawing Sheets

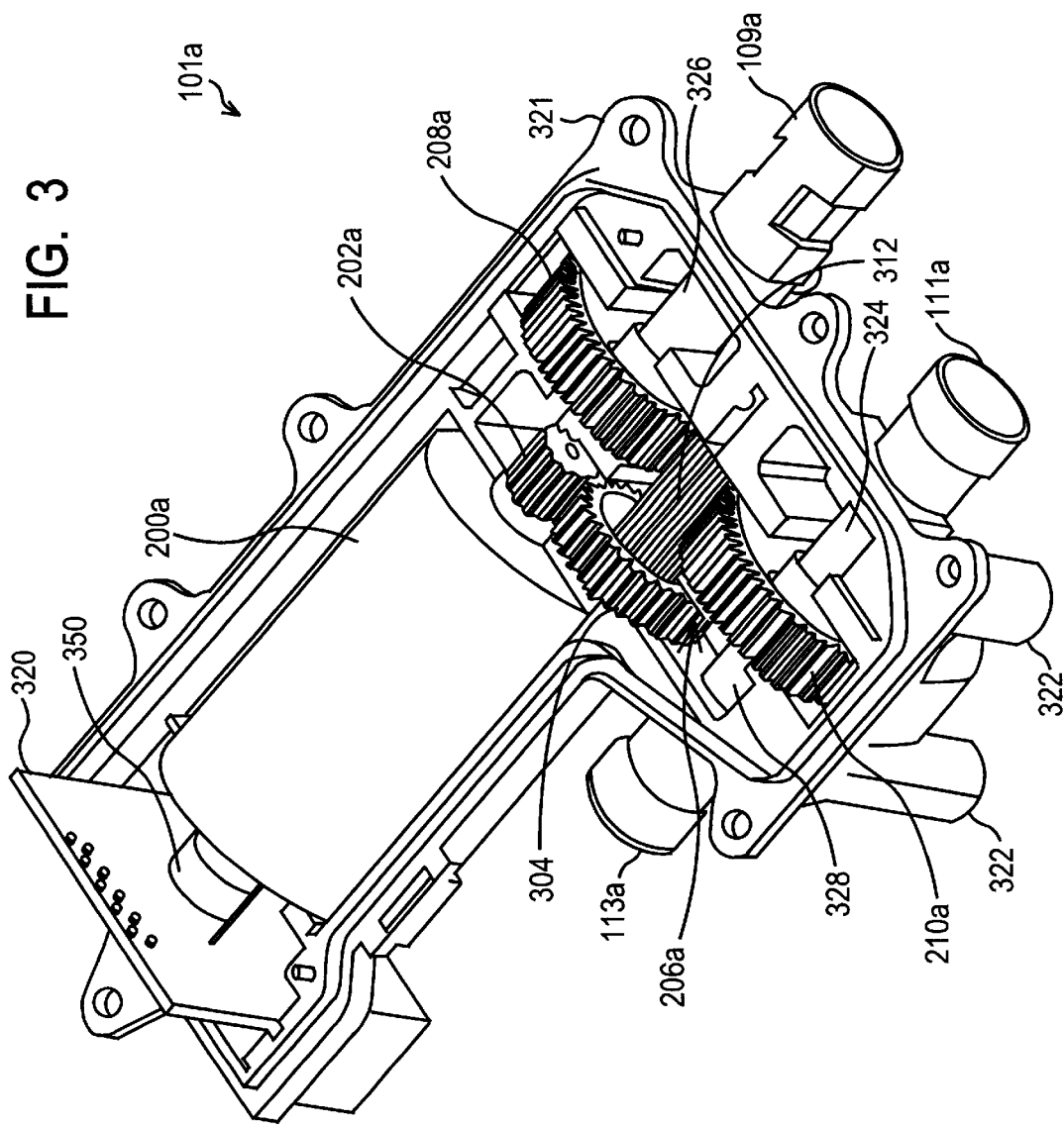

ELECTRO-MECHANICAL ACTUATOR FOR AN ADJUSTABLE PEDAL SYSTEM

CROSS-REFERENCE TO RELATED APPLICATIONS

The present application claims the benefit of U.S. provisional application serial No. 60/266,166, filed Feb. 2, 2001, and U.S. provisional application serial No. 60/275,991 filed Mar. 15, 2001, the teachings of which are incorporated herein by reference.

FIELD OF THE INVENTION

The present invention relates generally to adjustable pedal systems for passenger vehicles, and, in particular, to an actuator assembly for controlling the position of pedals within passenger vehicles.

BACKGROUND OF THE INVENTION

Adjustable pedal systems have been provided in vehicles to allow adjustment of the distance between the driver and the vehicle brake, accelerator and clutch pedals. These systems typically include an electro-mechanical actuator connected to an associated pedal, either directly or by a flexible cable. The actuator converts electrical power to rotational mechanical output power for moving the pedals to a desired position.

It is desirable for an adjustable pedal system to include a memory option that allows different users to set and automatically achieve user-defined position settings for the driver's seat, mirrors, pedals, steering wheel, etc. In such a system, the position of the pedals must be known. This can be achieved, for example, by direct measurement of the pedal location compared to a stationary point. This position information is typically supplied to a control module that collects all pertinent subsystem information. As these pedal systems are integrated into systems that control safety related functions, e.g. air bag deployment, accurate position information concerning the pedals becomes critical.

For those adjustable pedal systems that require position information, the position of the pedals relative to a stationary point should be established. During installation of the actuator to the pedal assembly, this relationship may either be unknown or vary significantly from a preset condition. Therefore, it would be desirable to allow the position sensor to automatically calibrate to the pedal assembly within a predetermined travel actuation interval, e.g., one full-travel actuation interval, during assembly of the actuator to the pedal assembly.

In addition, audible noise is a significant feature differentiating actuators in adjustable pedal systems and all other in-cabin actuation applications. In some applications, a loud system is desirable to alert an operator that the actuator is being cycled. In other applications, a quiet system is desirable to keep in-cabin noise to a minimum.

There is therefore a need in the art for an efficient, reliable and cost-effective actuator design for a vehicle adjustable pedal system that overcomes the deficiencies of the prior art. There is a further need in the art for an efficient, accurate, and reliable position sensing mechanism that is self-calibrating for installation to an adjustable pedal system. There is still a further need in the art for a method of tuning the actuator for audible noise performance.

SUMMARY OF THE INVENTION

According to one aspect of the invention, there is provided an actuator including a motor having a drive shaft, and a gear train coupled to the drive shaft, wherein the gear train includes a plurality of output gears and an associated plurality of output ports for providing a mechanical output from the actuator. The gear train may be provided in a variety of configurations, and may include a worm gear and worm wheel configuration for reducing audible noise.

Various position sensing configurations, including non-contact pulse counting, non-contact analog sensing, and contact analog sensing, may be provided for determining the position of a movable element, e.g. one or more adjustable pedals of an adjustable pedal system. A controller, e.g. a microprocessor, may control the position of the movable element in response to a user input, and may facilitate auto-calibration of the element upon installation.

According to another aspect of the invention, there is provided an actuator including an isolator having an effective spring constant and damping constant. The isolator is coupled to at least one component, e.g. a motor, of the actuator for isolating the component from a remainder of the actuator. Tailoring of the spring and damping constants of the isolator allows audible noise tuning. According to another aspect of the invention, an isolator may be coupled to a sub-frame for isolating the sub-frame from a housing of the actuator, wherein the sub-frame is configured to enclose a plurality of components of the actuator.

According to yet another aspect of the invention, there is provided an actuator including a component isolator having an effective first spring constant and first damping constant, the component isolator coupled to at least one component of the actuator for isolating the component from a remainder of the actuator; and a subframe isolator having a second spring constant and second damping constant, the sub-frame isolator coupled to a sub-frame integral to a housing of the actuator, wherein the sub-frame encloses at least the component.

BRIEF DESCRIPTION OF THE DRAWINGS

For a better understanding of the present invention, together with other objects, features and advantages, reference should be made to the following detailed description which should be read in conjunction with the following figures wherein like numerals represent like parts:

FIG. 3 is a perspective view of an exemplary actuator consistent with the invention with a top housing cover removed;

FIG. 1A is an exemplary circuit diagram of an analog conversion circuit for converting a pulse width modulation (PWM) signal to an associated analog signal;

DETAILED DESCRIPTION

Figure 1:
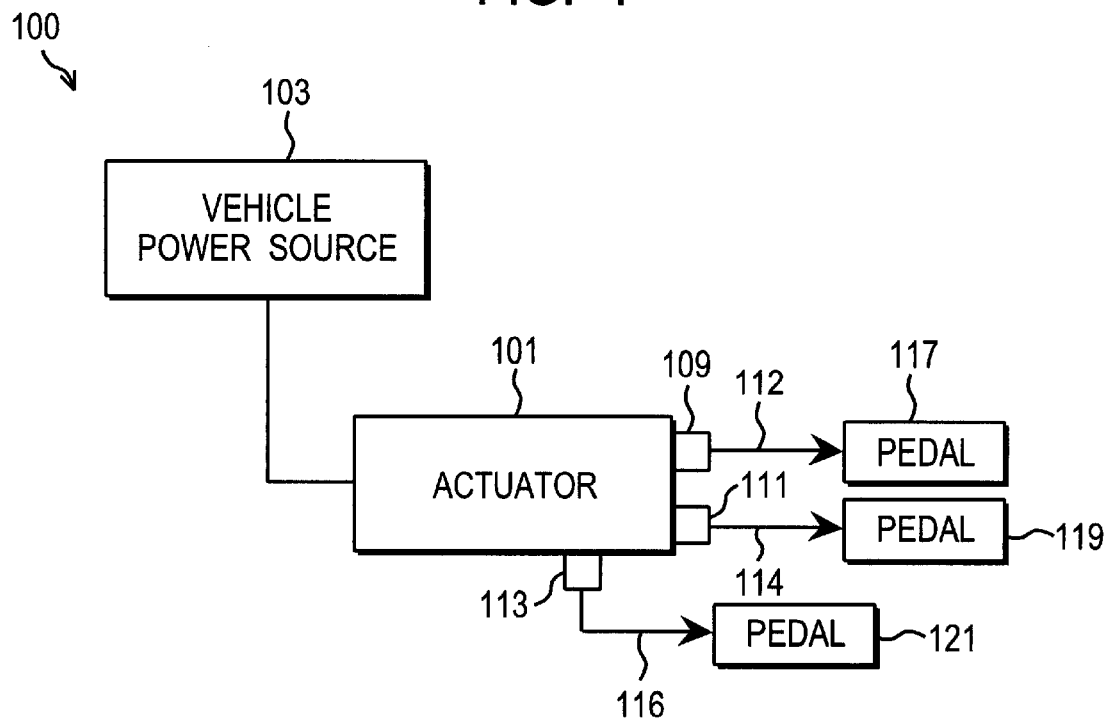
FIG. 1 is a simplified block diagram of an exemplary adjustable pedal system consistent with the invention.

FIG. 1 is a simplified block diagram of an exemplary adjustable pedal system 100 consistent with the present invention. Advantageously, the adjustable pedal system 100 may include an actuator 101 that receives electrical power from a vehicle power source 103, e.g., a vehicle battery. The actuator 101 may convert electrical energy to mechanical energy to drive a variety of devices. Advantageously, a single actuator 101 consistent with the invention may have a plurality of output ports 109, 111, 113 to provide the necessary mechanical output to drive an associated plurality of pedals 117, 119, 121.

The pedals may include a brake pedal, accelerator pedal, and clutch pedal.

Figure 1A:
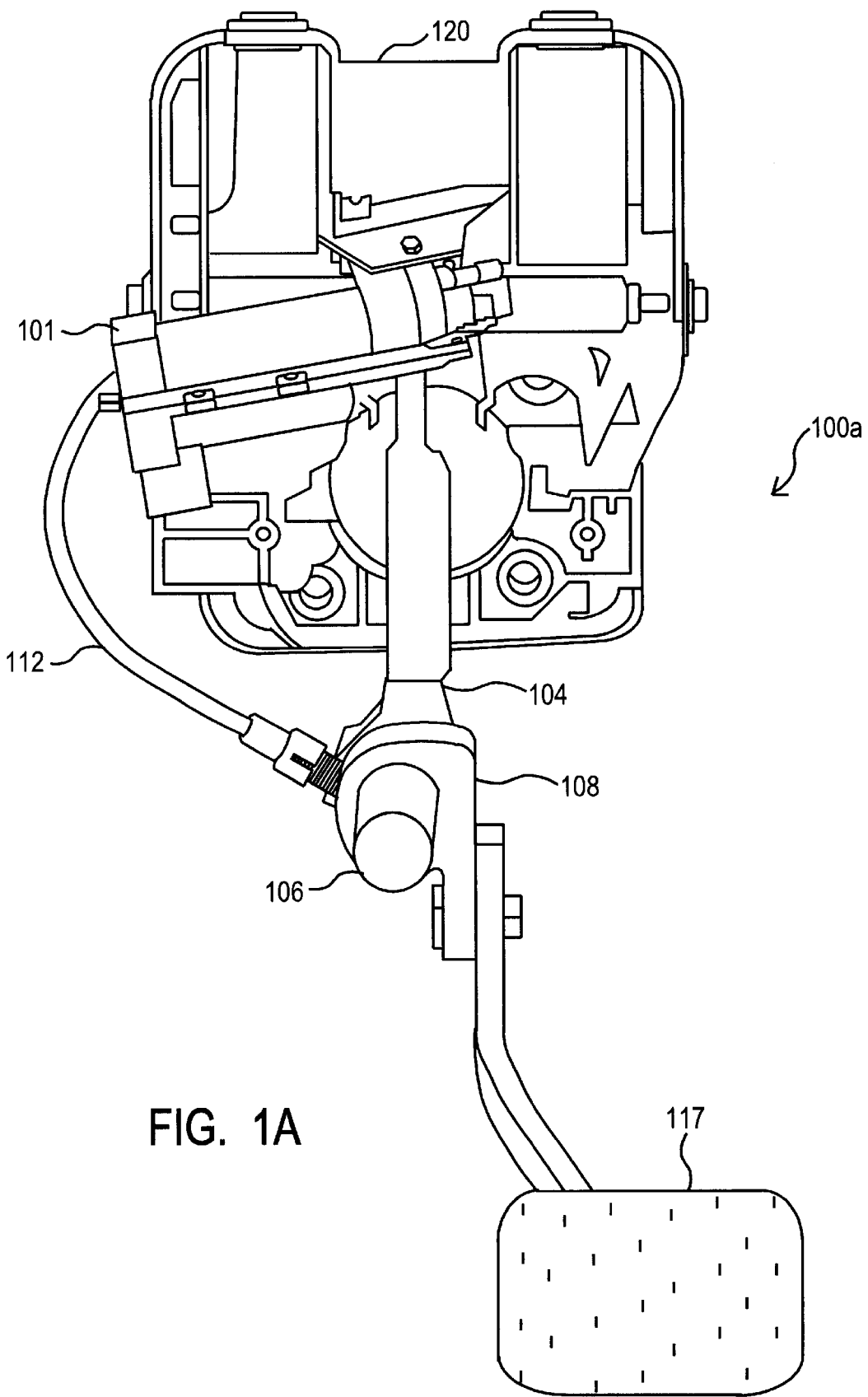
FIG. 1A is a top perspective view of an exemplary adjustable pedal system assembly consistent with the invention.

Those skilled in the art will recognize a variety of ways that the actuator 101 may be coupled to a pedal for driving that pedal. An exemplary adjustable pedal system 100a having a pedal 117, e.g., a brake pedal, coupled for reciprocating movement on a rod 104 is illustrated in FIG. 1A. In the illustrated embodiment of FIG. 1A, the rod 104 may include a worm gear 106 and the pedal may be coupled to a nut 108 threaded on the worm gear. The pedal may thus move axially along the rod depending on the direction of rotation of the worm 106.

The pedal 117 may thus be selectively positioned on the rod 104 depending on user preference. Consistent with the present invention, selective positioning is accomplished by operation of an actuator 101 that drives a gear train, e.g., the worm gear 106 on the rod 104, to move the pedal 117. Rotation of an output gear of the actuator may be coupled to the rod 104 through a flexible cable 112. Only one flexible cable 112 is illustrated in FIG. 1A, but a plurality of flexible cables may similarly be coupled to an associated plurality of pedals, e.g., accelerator pedal and/or clutch pedal.

In the illustrated embodiment of FIG. 1A, the actuator housing is mounted to any suitable portion 120 of a vehicle. Depending on the particulars of this portion 120, operation of the actuator may cause a variety of audible noises. As later detailed herein, an actuator consistent with the present invention may be configured for tailoring the audible noise of the actuator to a desired level.

Figure 2:
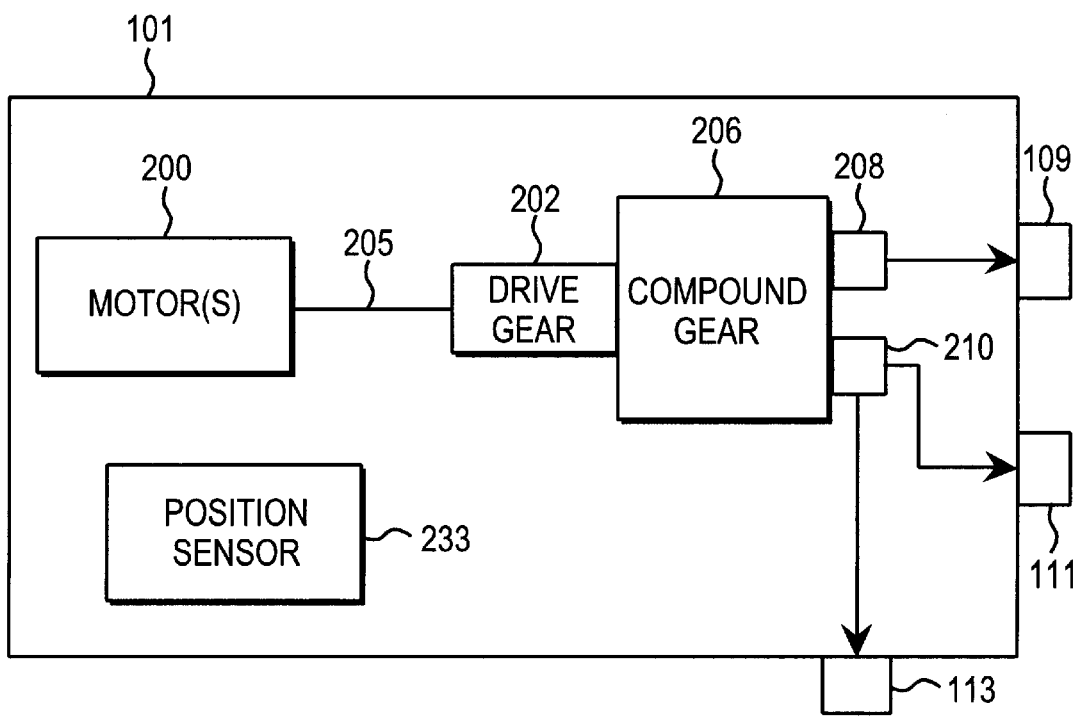
FIG. 2 is a simplified block diagram of the internal components of the actuator of FIG. 1 and FIG. 1A.

Turning to FIG. 2, a simplified block diagram of the internal components of an actuator 101 consistent with the present invention is illustrated. These components include a motor or a plurality of motors 200 for converting electrical energy from the power source 103 to mechanical energy. The output shaft 205 of the motor 200 may be coupled to a drive gear 202, e.g., a pinion gear, a worm gear, or the like. The drive gear may be in meshing engagement with a compound gear 206, e.g., a spur gear, a worm wheel, or the like. The compound gear may be in meshing engagement with a plurality of output gears 208, 210. Each output gear may then provide one or more associated mechanical outputs through associated output ports 109, 111, 113. In the illustrated embodiment, output gear 210 provides mechanical outputs to two output ports 111, 113 and output gear 208 provides a mechanical output to one output port 109.

In addition, the actuator 101 may include an integrated position sensor 233 for sensing the position of the pedals 117, 119, 121 relative to a fixed location. The position information may be supplied to a control module that collects all affected sub-system information. This position information may be used in memory positioning systems, and may-be integrated into safety related functions, e.g., air bag deployment. The positioning sensor 233 may be a non-contact pulse counting sensor, a non-contact analog sensor, or a contact analog sensor as will be later described in greater detail.

Figure 4:
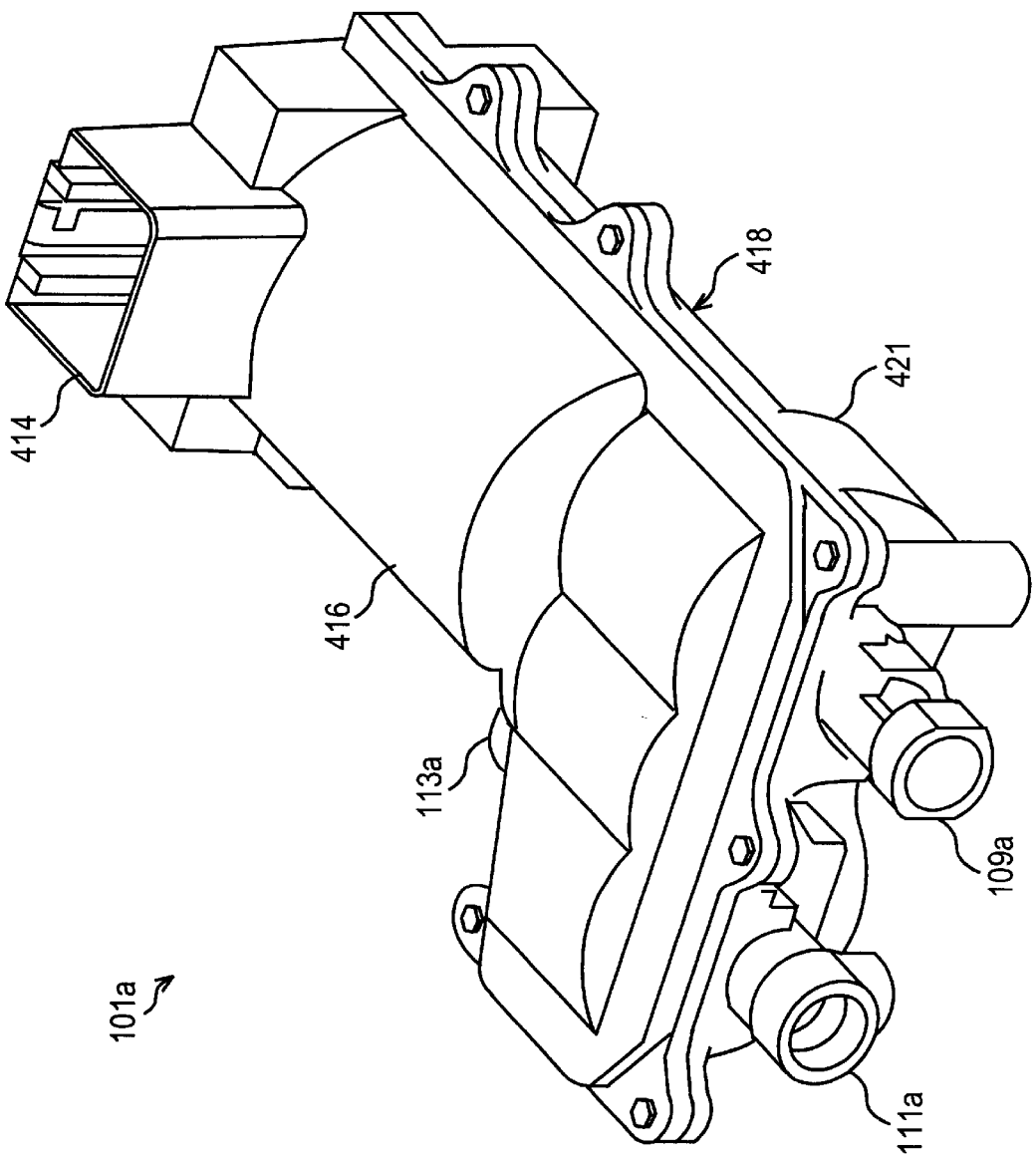
FIG. 4 is a perspective view of the actuator shown in FIG. 3 with the top housing cover installed.

Turning to FIGS. 3 and 4, one exemplary embodiment of an actuator 101a consistent with the present invention having a non-contact sensor is illustrated. The non-contact sensor may include a magnet 350 and a magnetic sensor disposed on a PCB 320 as will be described later in greater detail. For elements common to the various embodiments of the invention, the numerical reference character between the embodiments is held constant, but distinguished by the addition of an alphanumeric character to the existing numerical reference character.

The illustrated actuator 101a includes a motor 200a, a drive shaft gear, e.g., a pinion gear 202a, on the output shaft of the motor in meshing engagement with a large diameter portion 304 of a compound gear 206a, and first 208a and second 210a output spur gears in meshing engagement with a small diameter portion 312 of the compound gear 206a disposed therebetween. An electrical energy source (not shown), e.g. the vehicle battery, may be connected to the actuator 101a, along with other control inputs, via connector pins in an integral connector assembly 414, which may be formed on a cover portion 416 of the actuator housing 418. The connector pins may provide electrical connections to the PCB 320, which may include motor control and position sensing electronics for driving the motor. A bottom portion 421 of the housing may include integral locating features for the actuator components as well as mechanical attachment points 322 for securing the actuator to a fixed location.

The output gears 208a, 210a each include concentric output coupling projections 324, 326, 328 extending axially therefrom. In the illustrated embodiment, the coupling projections extend into associated actuator output ports 109a, 111a, 113a formed in the housing. Flexible cables, e.g. cable 112 may be coupled to the projections through the ports for coupling the associated output gears for driving multiple pedal systems. For example, output projections 324 and 326 may be coupled for independently driving the accelerator and brake pedals, respectively, or the projections 324, 326, and 328 could be coupled for driving accelerator, brake and clutch pedals, respectively.

Turning now to FIGS. 5–8, there is shown another exemplary embodiment 101b of an actuator 101 consistent with the invention having a contact position sensor and a non-contact position sensor. Details of the contact position sensor and non-contact position sensor are provided below.

The illustrated actuator 101b includes a motor 200b, a drive shaft gear, e.g., a pinion gear 202b, on the output shaft of the motor in meshing engagement with a large diameter portion 504 of a compound gear 206b, and first 208b and second 210b output spur gears in meshing engagement with a small diameter portion 512 of the compound gear 206b disposed therebetween. An electrical energy source, e.g. the vehicle battery, may be connected to the actuator, along with other control inputs, via connector pins 507. The connector pins may provide electrical connections to a printed circuit board (PCB) 520, which may include motor control and position sensing electronics for driving the motor.

The output gears 208b, 210b each include concentric output coupling projections 524, 526, 528, 529 extending axially therefrom. In the illustrated embodiment, the coupling projections 524, 526, 528 are configured to receive flexible cables, e.g. cable 112 for coupling the associated output gears for driving multiple pedal systems. For example, output projections 524 and 526 may be coupled for independently driving the accelerator and brake pedals, respectively, or the projections 524, 526, 528 could be coupled for driving accelerator, brake and clutch pedals, respectively. As will be described in greater detail below, the output projection 529 may be used for position sensing.

Advantageously, the output gears 208a, 210a and 208b, 210b in each of the exemplary embodiments 101a and 101b are driven by a common compound gear 206a, 206b. To establish a proper and safe "step over" position relationship between the accelerator pedal and the brake pedal for a given position setting, the gear ratio of one output gear versus the other may be modified to establish a desired rate of relative position change between the pedals. Thus, the actuator may be easily configured to accommodate any rate of relative position change by simply modifying the output gear ratio of the output gears. This is a highly desirable option for vehicle and adjustable pedal system manufacturers.

The ability to detect if one or more of the cables connecting the actuator to the pedal system has become disconnected is also highly desirable. This is required to prevent an incorrect or unacceptable "step over" from one pedal to the other. This could result in a safety issue during an emergency condition where the operator cannot quickly locate the brake/accelerator pedal from the accelerator/brake pedal. To detect the condition of cable connection failure in a manner consistent with the invention, the system may be configured so that under normal operation, the brake pedals will not move when the actuator is energized and a nominal force (weight of a foot) is applied to any pedal in the system. When the pedals are not loaded, there is a nominal amount of torque required of the motor in order to move the pedal system.

Applied current to the motor is linearly proportional to torque. If one or more of the cables becomes disconnected over time, the amount of torque required to actuate the pedal system will be significantly lower, and hence the amount of applied current will be proportionately lower. By using an algorithm in the motor control electronics that compares the current profile over pedal travel to a known value; the system can disable the actuator from being energized.

As the prior actuator embodiments 101a and 101b illustrate, an actuator consistent with the invention may have one or more integral position sensors. Such a sensor may be 1) non-contact pulse counting sensor, 2) non-contact analog sensor or a 3) contact analog sensor as detailed below.

I. Non-contact Pulse Counting Sensor

In the exemplary actuator embodiment 101a illustrated in FIGS. 3 and 4, a non-contact pulse counting sensor is illustrated. The non-contact pulse counting sensor may include a magnet 350 and a magnetic sensor, e.g. a Hall effect device, disposed on the PCB 320 to provide one or more pulse outputs associated with each rotation of the magnet 350.

In one embodiment, the magnet 350 may be an axially charged magnet with multiple poles coupled to an elongated end of the motor shaft as illustrated in FIG. 3. This elongated end may extend beyond the end cap of the motor placing the magnet in close proximity to a Hall Effect Switch (HES) disposed on the PCB 320 in a magnetic sensing circuit 900 as illustrated, for example, in FIG. 9. Those skilled in the art will recognize that the magnetic sensing circuit 900 provides either a pull up or pull down digital pulse signal when the HES is switched on/off by rotation of the magnet. Accordingly, a number of pulses are provided by the circuit 900 depending on the number of revolutions of the axially disposed magnet 350 on the output shaft of the motor 200a.

By keeping track of the number of pulses provided by circuit 900 in a microprocessor control module of the PCB 320, and also by knowing the number of poles on the magnet 350, the gear ratio between the motor shaft and the output gears 208a, 210a of the actuator 101a, and the ratio of the rest of the adjustable pedal system, the relative position of the pedals may be determined and controlled by the control module. Further, the PCB 320 may contain motor traces providing motor polarity to the control module for determining if the pedals are moving fore or aft from motor rotational direction. Advantageously,an auto calibration mechanism may also be present in a non-contact pulse counting sensor consistent with the invention. For instance, the control module on the PCB 320 may be programmed to provide an installation sequence to accommodate misalignment of the pedal's position to the sensor output. In this way, a-non-contact pulse counting sensor consistent with the invention automatically calibrates to the end stroke positions of the adjustable pedal system.

Figure 9:
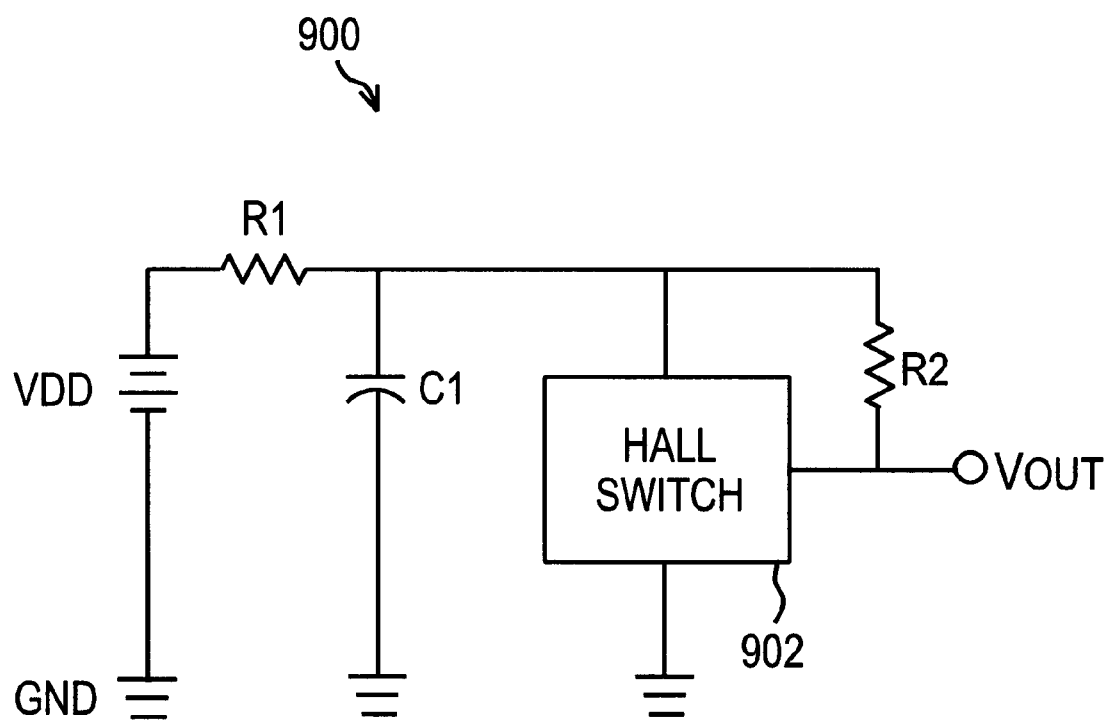
FIG. 9 is an exemplary position sensing circuit using a single Hall Effect Switch.

Turning to FIGS. 5–8 (best seen in FIG. 8), another embodiment of a non-contact pulse counting sensor is illustrated. In contrast to the pulse counting sensor embodiment of FIG. 3, the PCB 520 in this embodiment is located under the motor 200b parallel to the motor shaft. In addition, a magnet is included in a plug 550 that may be inserted into the unused cavity 560 in the projection 529 to activate a magnetic switch 570 on the PCB 520. The magnetic switch 570 may be an HES and may be incorporated in a similar exemplary magnetic sensing circuit 900 as illustrated in FIG. 9. A number of pulses will be provided by the circuit 900 depending on the number of revolutions of the output gear 210b. Again, by keeping track of the number of pulses provided by circuit 900 in a control module of the PCB 520, and also by knowing the number of poles on the magnet, the ratio between the output gear 210b and the rest of the adjustable pedal system, the relative position of the pedals can be determined and controlled by the control module.

Figure 10:
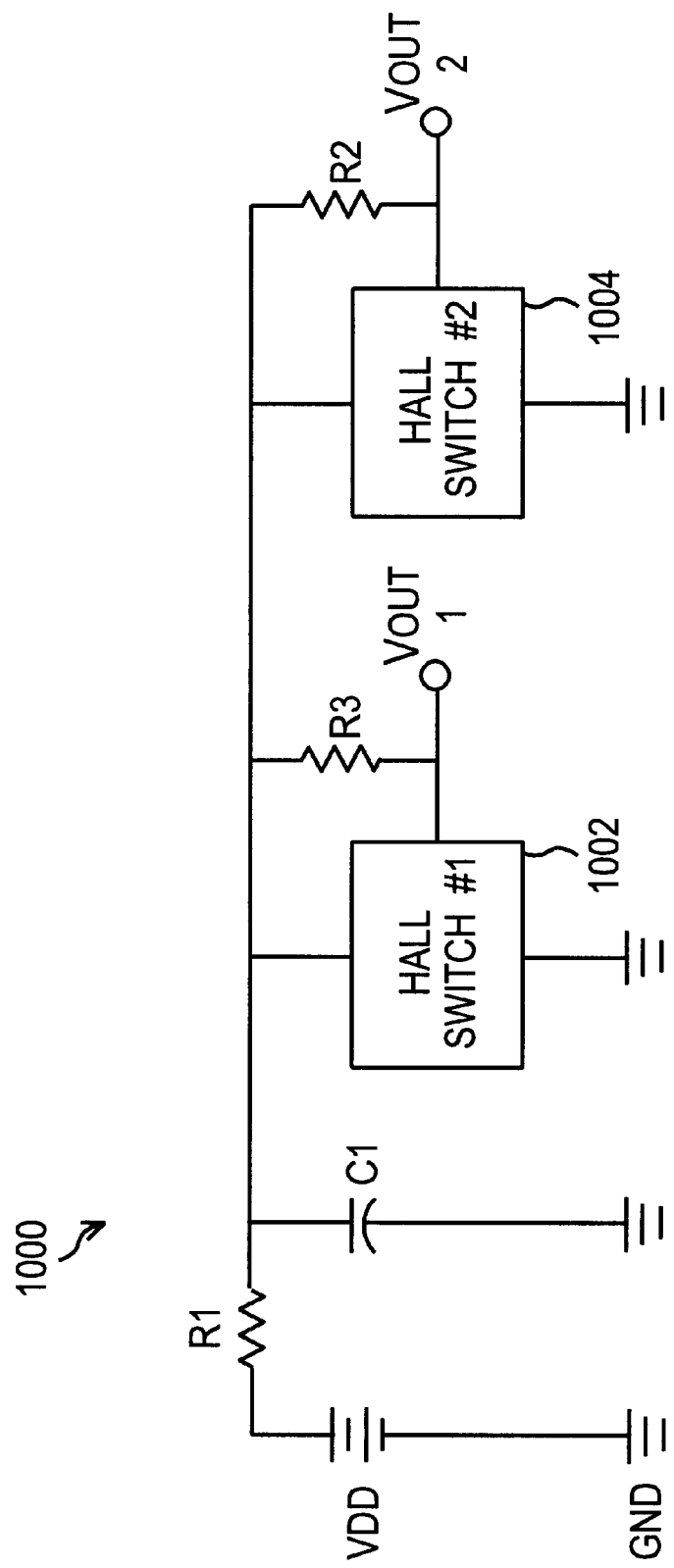
FIG. 10 is an exemplary position sensing circuit using two Hall Effect Switches for redundancy.

Redundancy in either the first or second embodiment of the non-contact pulse counting sensor may be incorporated by installing back to back magnetic sensing switches as illustrated in the exemplary redundant magnetic sensing circuit 1000 of FIG. 10. Such an exemplary circuit 1000 may include a first HES 1002 that provides a complimentary digital pulse output signal to a second HES 1004. For example, the first switch 1002 would output a high signal when the second switch 1004 is low, and vice versa. In addition to redundancy, the exemplary circuit 1000 would also provide diagnostic capabilities.

II. Non-contact Analog Sensor

A non-contacting analog sensor may also be provided in an actuator consistent with the invention. The location of the magnet 350 and magnetic sensing circuit on the PCB 320 or 520 in a non-contacting analog sensor configuration may be similar to that earlier described with reference to the non-contacting pulse counting sensor configurations. In general, however, a non-contact analog sensor provides an analog output signal by converting the pulse outputs of a magnetic sensing circuit to an analog output that is ratio metric with supply voltage to the PCB 320 or 520.

Figure 11:
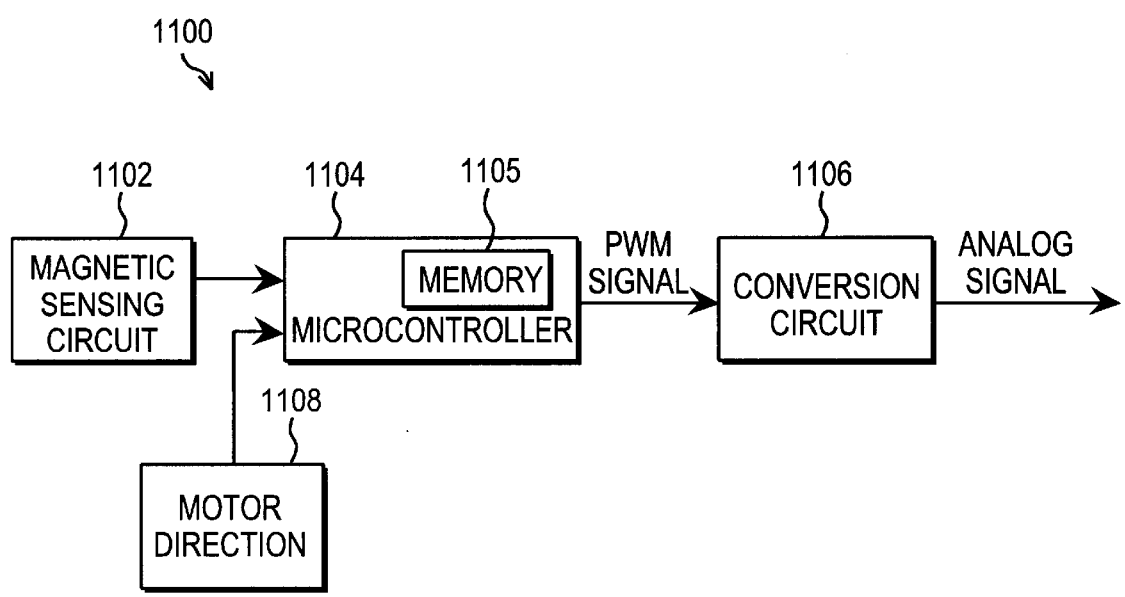
FIG. 11 is a block diagram of the control electronics embedded on a printed circuit board (PCB) for use in a non-contact position sensor system integral with an actuator consistent with the invention.

Turning to FIG. 11, a general block diagram of exemplary electronics 1100 for use in a non-contact analog sensor is illustrated. In the illustrated embodiment, a magnetic sensing circuit 1102 responsive to the magnetic field generated by the rotating magnet is provided. An exemplary magnetic sensing circuit 1102 may include an HES as earlier described in the exemplary HES circuit 900 and the HES redundant circuit 1000. The magnet may be coupled to any associated rotating part of the actuator.

The magnetic sensing circuit 1102 may provide digital pulse signals to a microcontroller 1104 in response to rotation of the magnet. A microcontroller 1104 may count the pulses from a predetermined reference count and store such a count in memory 1105. Such memory 1105 may be an integral semiconductor memory, e.g., ROM, EPROM, or EEPROM, or a memory circuit may also be located external to the microcontroller 1104. The microcontroller may be programmed to control pedal position based on the stored count upon receipt of a user-controlled input.

The microcontroller 1104 may be one-time-programmable (OTP) and may be programmed to accommodate any changes to mechanical gear ratios versus a programmed value. An algorithm may be used to set the count starting point after the actuator and adjustable pedal system have been actuated at least once to take into account any position discrepancies. If the microcontroller 1104 uses flash memory, it may be programmed and the count set after installation to the pedal assembly. In either configuration, the program may be configured to electronically accommodate misalignment of the pedal's position to the sensor output and therefore calibrate to the end of stroke positions of the adjustable pedal system. The motor direction 1108 may be determined by sensing the motor polarity and may be provided as an input to the microcontroller 1104 to indicate if the total pulse count should be increased or decreased when the actuator is energized.

Advantageously, an auto calibration mechanism may be present in a non-contact analog sensor consistent with the invention. For instance, a control module on the PCB may be programmed to provide-an installation sequence to accommodate misalignment of the pedal's position to the sensor output. In this way, a non-contact analog sensor consistent with the invention allows automatic calibration to the end of stroke positions of the adjustable pedal system.

Figure 11A:
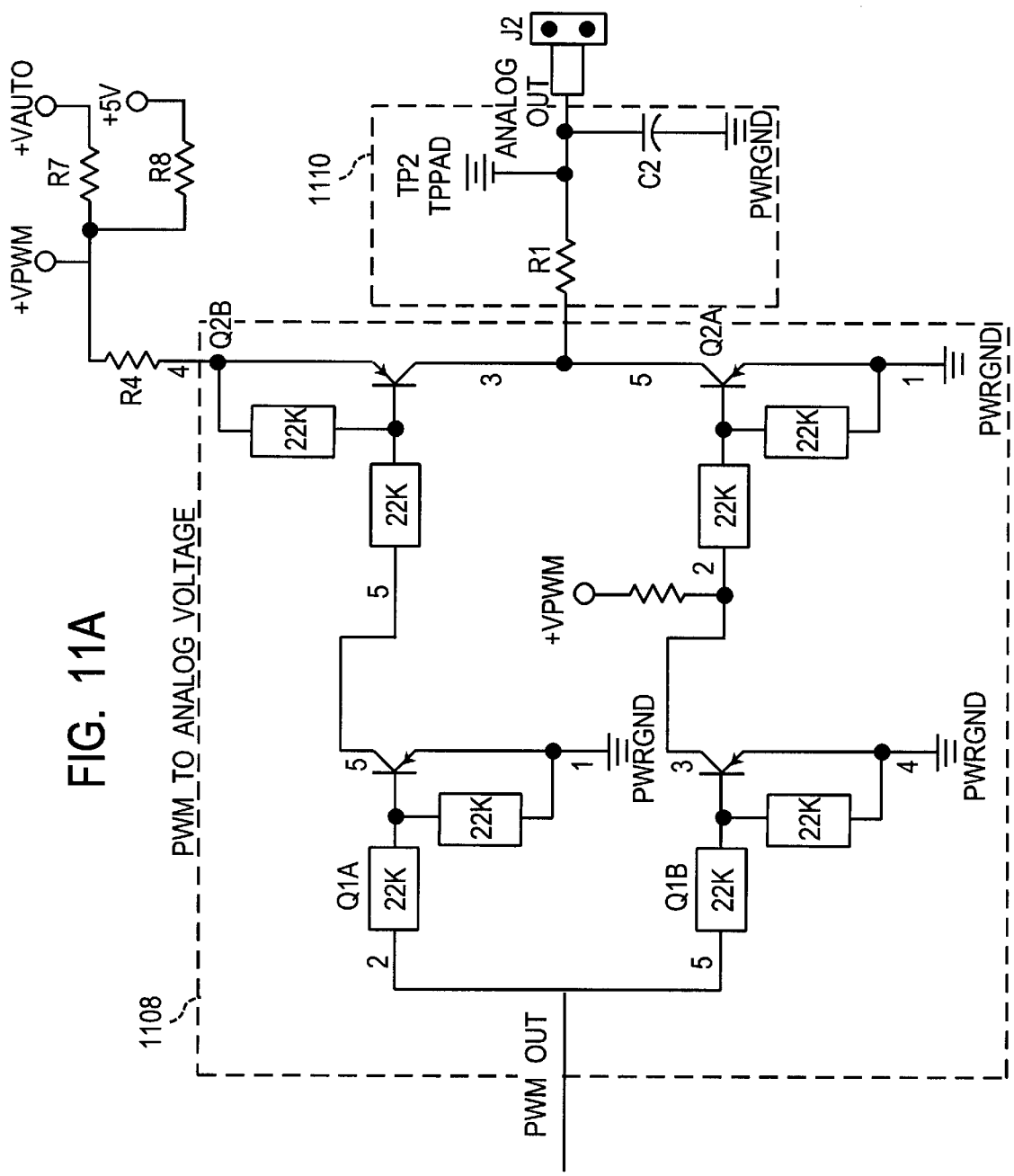

The microcontroller 1104 may also convert the pulse count data to a PWM signal. The PWM duty cycle of the PWM signal may be ratiometric to the PCB's supply voltage and proportional to the digital pulse count. The PWM signal can be used as an output directly if the control module of the PCB requires a digital input. However, if the control module requires an analog input, a conversion circuit 1106 may be utilized to convert the PWM signal to an analog signal proportional to the supply voltage of the PCB. One exemplary conversion circuit may be as illustrated in FIG. 11A, which includes a half-bridge transistor circuit 1108 coupled to a low pass RC circuit 1110. Those skilled in the art will recognize a variety of circuits that may perform a similar PWM to analog signal conversion function.

In addition, although not required, several other circuits may be used with the electronics 1100 for a non-contact analog sensor in order to monitor, regulate, and protect various portions of the electronics 1100. These circuits may include an input power regulating circuit and monitoring circuit, a motor EMI suppression and overcurrent protection circuit, a motor direction monitor circuit, and a microcontroller brown out protection circuit to name a few.

Figure 12:
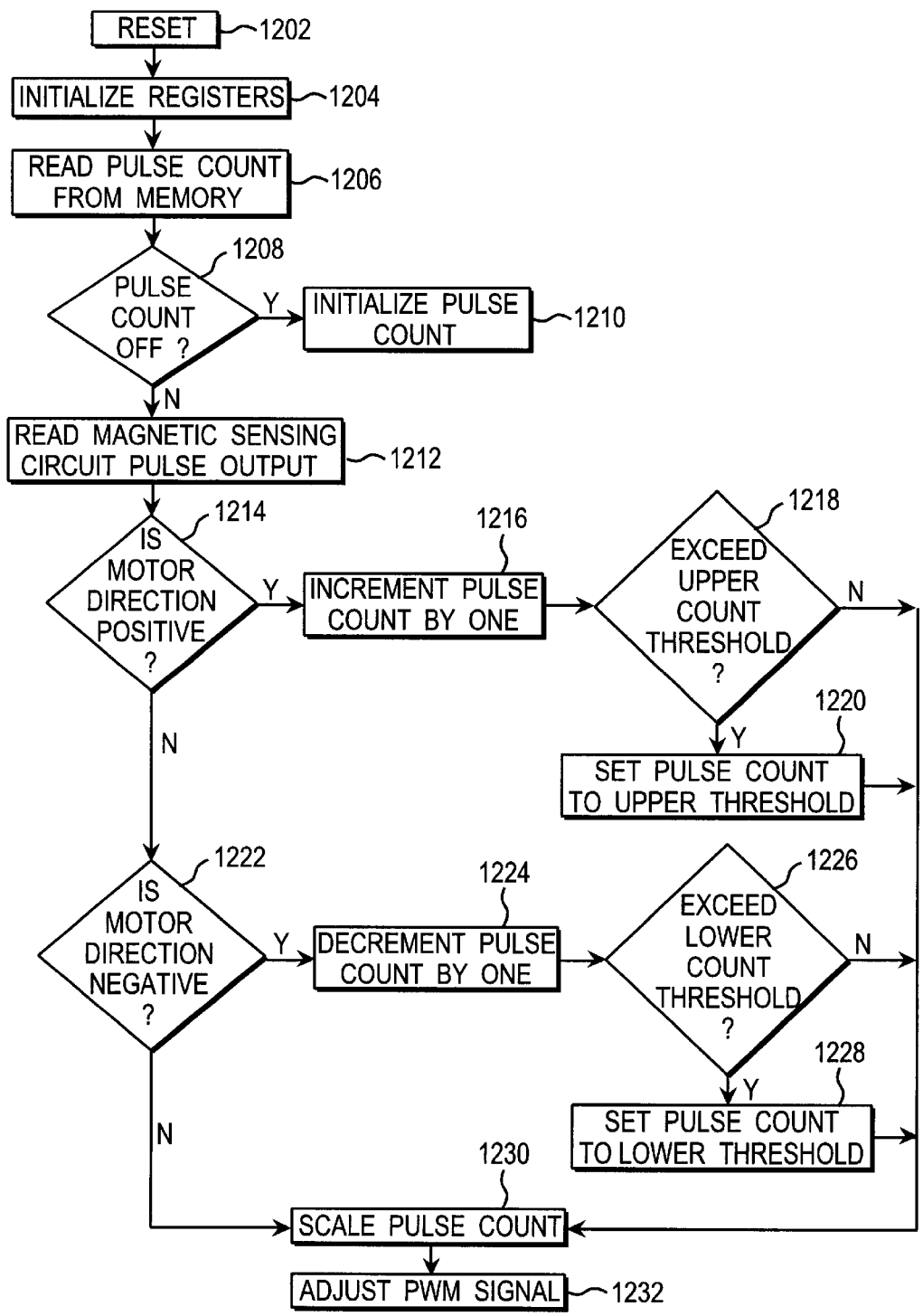
FIG. 12 is an exemplary flow chart illustrating operation of exemplary control electronics for use in a non-contact position sensor system integral with an actuator consistent with the invention.

An exemplary flow chart for the microcontroller 1104 firmware is illustrated in FIG. 12. During reset 1202, the microcontroller's registers are initialized 1204, and the digital pulse count is read 1206 from memory 1105 of the microcontroller 1104. If the pulse count is off 1208 then the pulse count is initialized 1210. The pulse count may be initialized to a predetermined initial pulse count value, e.g., 20 counts.

If the pulse count is not off after subsequent power ups, the microcontroller reads the magnetic sensing circuit outputs 1212. If the motor direction is positive 1214, the pulse count is incremented by one count 1216. The upper pulse count threshold is then checked 1218 and the pulse count is set to the upper pulse count threshold 1220 if the threshold is exceeded. In contrast, if the motor direction is negative 1222, the pulse count is decremented by one 1224. Similarly, the lower pulse count threshold is then checked 1226 and the pulse count is set to the lower threshold limit 1228 if the lower threshold is exceeded.

Once the pulse count has been incremented or decremented and threshold levels have been checked, the next step is to scale the pulse count 1230. For example, the pulse count may be scaled to an 8-bit number from 0 to 255. The PWM signal output from the microcontroller 1104 may then be adjusted 1230 based on the scaled pulse count.

The scaled pulse count may be reflected in the duty cycle of the PWM signal output from the microcontroller 1104. For example, in one embodiment a scaled pulse count of 20 counts corresponds to a 10% duty cycle of the PWM signal and a scaled pulse count of 470 counts corresponds to a 90% duty cycle. The relationship between scaled counts and duty cycle is linear between these points. Accordingly, the microcontroller may produce a PWM signal have a duty cycle linearly proportional to the scaled number of counts.

In addition, for a non-contact analog sensor consistent with the present invention, a corresponding conversion circuit 1106 may convert the above described PWM signal to an analog signal traversing between 10% of nominal PCB supply voltage and 90% of nominal PCB supply voltage.

III. Contact Analog Sensor

An exemplary contact analog sensor is illustrated in the exemplary actuator 101b of FIGS. 5–8. In the illustrated exemplary embodiment, a spur gear plug 550 is provided in an unused cavity 560 of the projection 529 from the second output gear 210b. The spur gear plug 550 drives a mating sensor gear assembly 580 that, in turn, rotates a lead screw 584.

Figure 13:
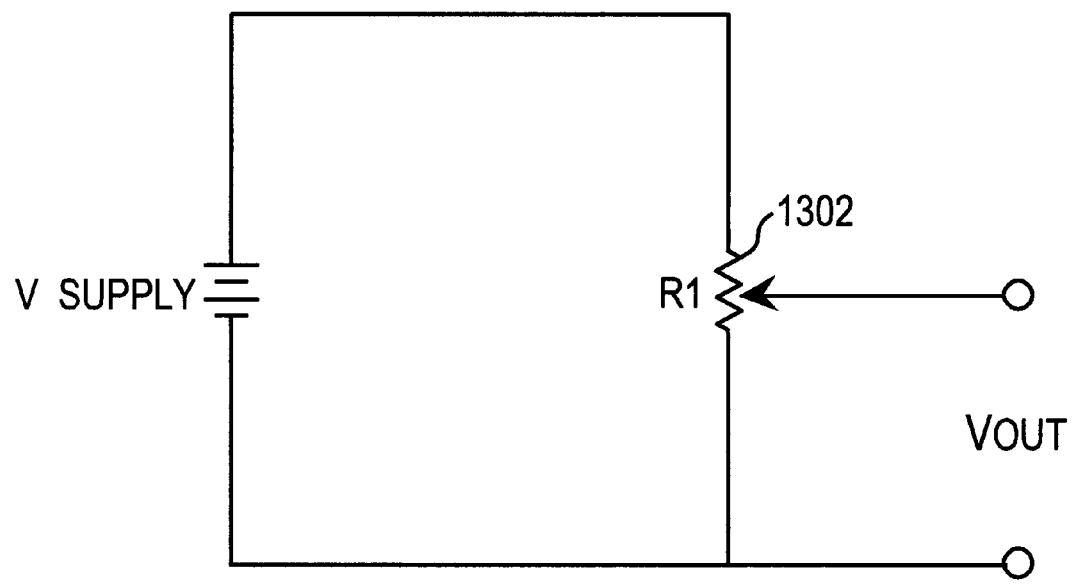
FIG. 13 is an exemplary circuit diagram for use in a contact position sensor integral with an actuator consistent with the invention.

Riding on the lead screw 584 is a wiper carrier assembly 582 carrying a wiper 586. A polymer thick film (PTF) may be provided on the PCB 520 to provide a linear resistive potentiometer. An exemplary linear resistive potentiometer is illustrated in FIG. 13. The wiper 586 may contact the PTF as the wiper carrier assembly moves along the lead screw to act as a high conductivity-shorting bar between the output and the main PTF resistor 1302. The output voltage (Vout) is, therefore, dependent on the position of the wiper 586 along the PTF on the PCB 520 and directly proportional to pedal position. A desired pedal position may thus be achieved by energizing the motor to obtain an output voltage associated with the desired pedal position. Redundancy can be incorporated by 1) using a multi-contact wiper geometry or 2) incorporating two wiper sets on the wiper carrier assembly 582 and having redundant thick film circuits on the PCB 520.

Figure 14A:
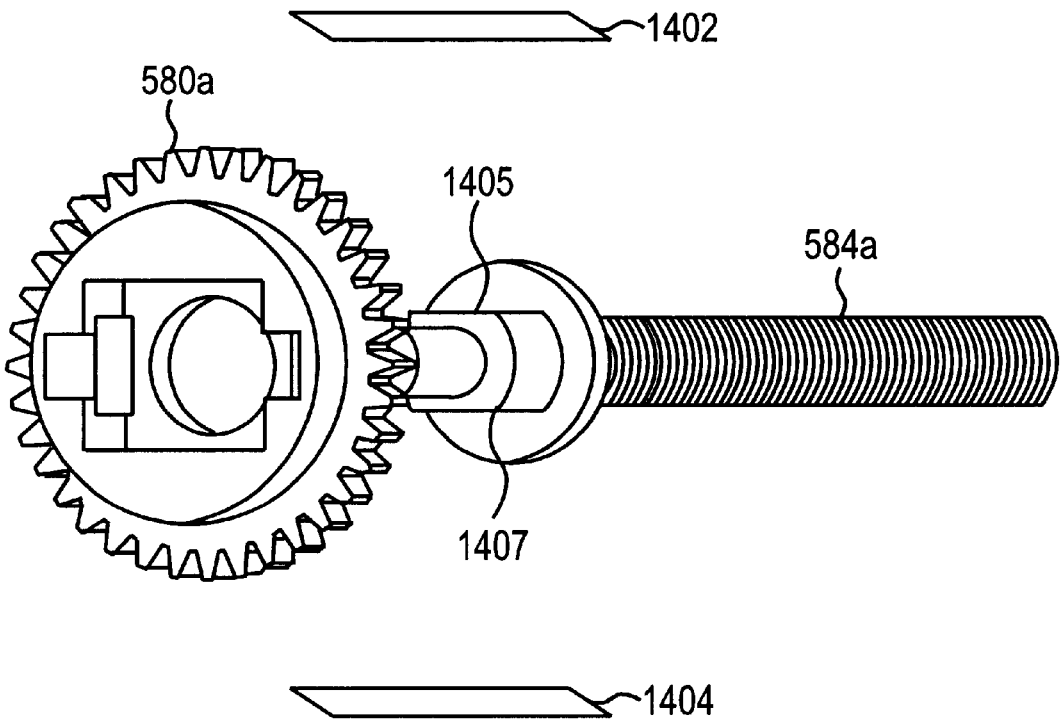
FIG. 14A is an exploded perspective view of one embodiment of a trip mechanism for a contact sensor consistent with the invention.
Figure 14B:
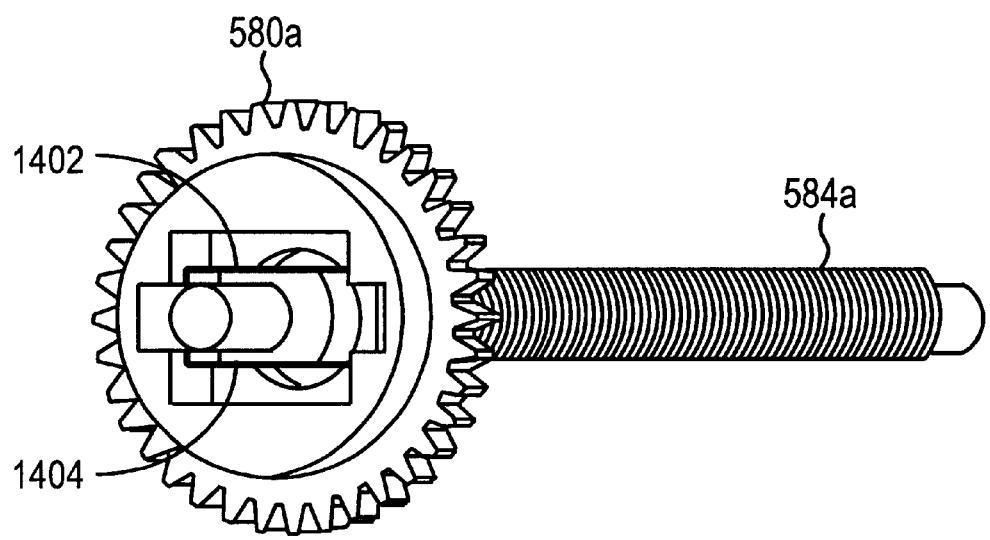
FIG. 14B is an assembled perspective view of the embodiment of FIG. 14A.
Figure 15A:
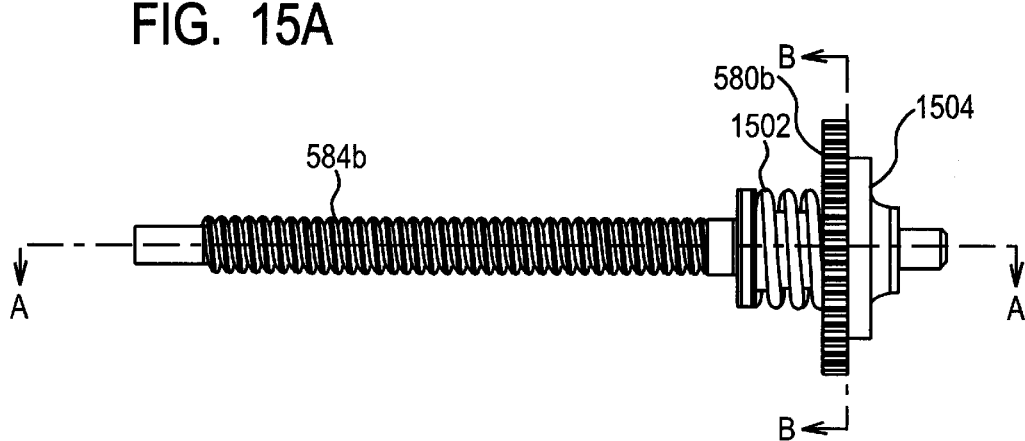
FIG. 15A is a perspective view of a second embodiment of a trip mechanism for a contact sensor consistent with the invention having a sensor gear and cam disk normally in mating engagement.
Figure 15B:
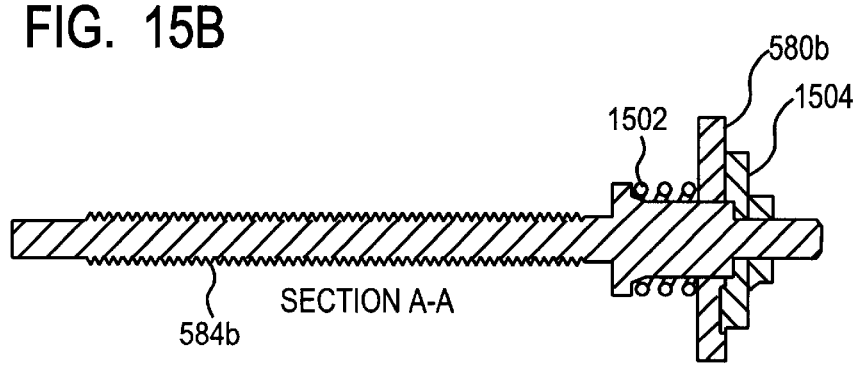
FIG. 15B is a cross sectional view taken along the line A—A of FIG. 15A.
Figure 15C:
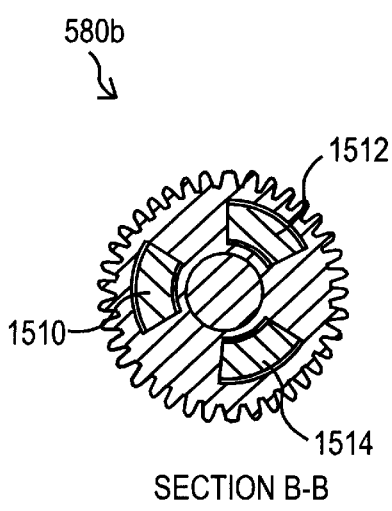
FIG. 15C is a view of the sensor gear taken along the line B—B of FIG. 15A.
Figure 15D:
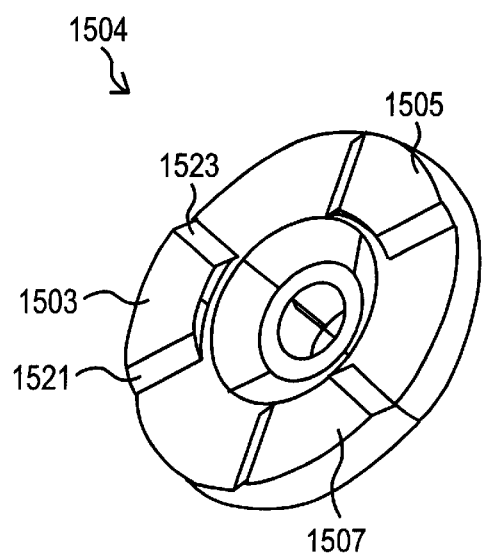
FIG. 15D is a perspective view of a cam disk for use in the embodiment of FIG. 15A.

The contact position sensor may be calibrated to match pedal position by including a trip mechanism to prevent overdriving the contact position sensor system. One such trip mechanism may be a clutch type design as illustrated in FIGS. 14A and 14B. The embodiment illustrated in FIG. 14A includes a first cantilever spring 1402 and a second cantilever spring 1404 integral with the sensor gear 580a. The lead screw 584a extends through the spring gear assembly. When the wiper carrier (not illustrated) hits an obstruction such as end of travel, sufficient torque is applied to the sensor gear assembly to drive the gear and the springs over the flats 1405, 1407 on the lead screw, as shown in FIG. 14B. This prevents the wiper carrier threads from being damaged and allows the output gears 208b, 210b to continue to rotate with a minimal amount of power reduction.

Another clutch mechanism to prevent overdriving the contact position sensor system is illustrated in FIGS. 15A–15D. This clutch mechanism generally includes a lead screw 584b, a spring 1502, a sensor gear 580b, and a cam disk 1504. The cam disk 1504 has raised cam portions 1503, 1505, and 1507 that mate with cam pockets 1510, 1512, and 1514 of the sensor gear 580b. Each raised cam portion, e.g. 1503, may also have radial surfaces 1521, 1523. The cam disk 1504 is fixed relative to the lead screw 584b.

The cam disk 1504 and the sensor gear 580b remain engaged until the torque required to turn the sensor gear 580b exceeds a predetermined torque level, e.g., when the wiper carrier hits an obstruction. At this time, the sensor gear 580b and the cam disk 1504 disengage as the raised cam portions 1503, 1505, 1507 disengage from the cam pockets 1510, 1512, 1514. The radial surfaces 1521, 1523 of the cam pockets may also be inclined at a certain pitch associated with the predetermined torque level. Such a clutch mechanism also provides an audible noise to an operator such as a tapping sound as the cam disk 1504 and the sensor gear 580b engage and disengage when the predetermined torque level is reached and maintained.

Figure 16A:
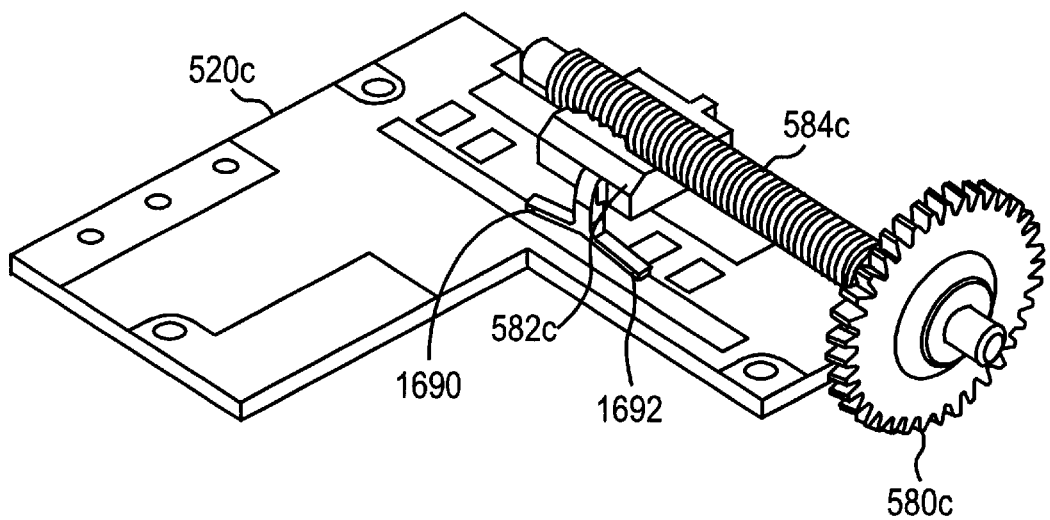
FIG. 16A is a perspective view of a third embodiment of a trip mechanism for a contact sensor consistent with the invention having a half-thread wiper carrier with cantilever spring fingers.
Figure 16B:
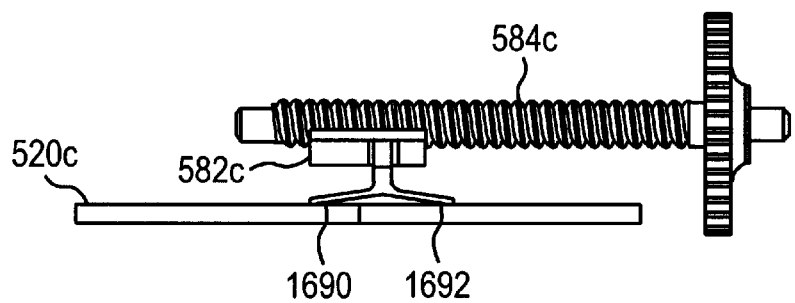
FIG. 16B is a cross sectional view of the embodiment of FIG. 16A with the wiper carrier in a free state.
Figure 16C:
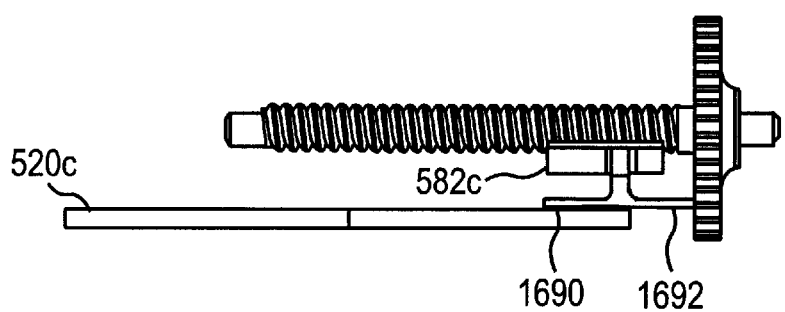
FIG. 16C is a cross sectional view of the embodiment of FIG. 16A with the wiper carrier in a blocked state.

Turning to FIGS. 16A, 16B, and 16C, yet another embodiment of a clutch mechanism to prevent overdriving the contact position sensor system is illustrated. In this embodiment, the wiper carrier 582c may be formed with a half-thread relative to the lead screw 584c, and the wiper contacts are configured as cantilever spring wipers 1690, 1692. As the wiper carrier reaches an obstruction, e.g., the end of travel as illustrated in FIG. 16C, the cantilever spring wipers compress against the PCB 520c. The engaged threads of the lead screw 584c and wiper carrier 582c then force the wiper carrier linearly away from the sensor gear 580c causing the wiper carrier to "jump" threads on the lead screw without mechanical damage.

Figure 5:
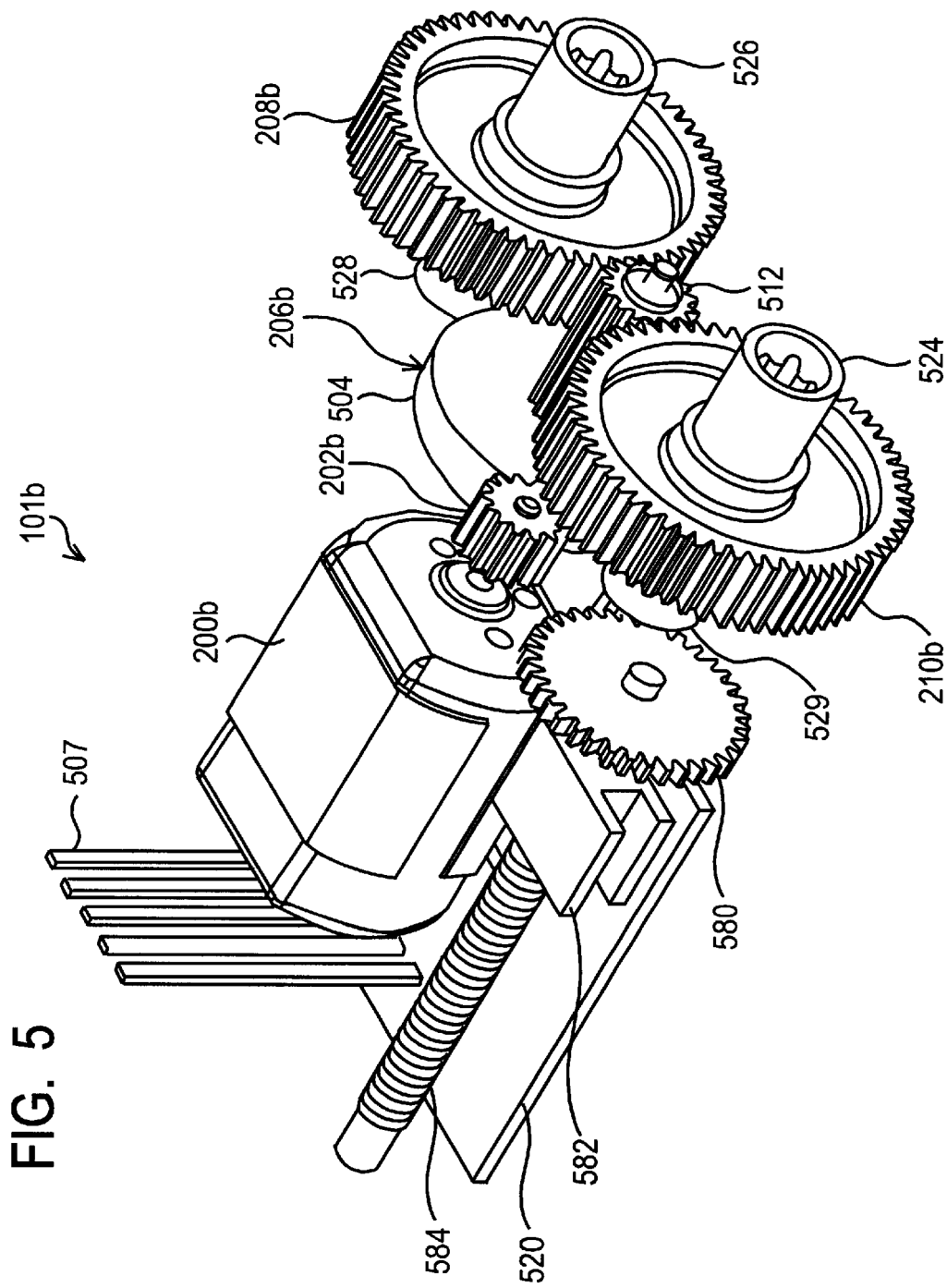
FIG. 5 is a perspective view of another exemplary actuator consistent with the invention.
Figure 6:
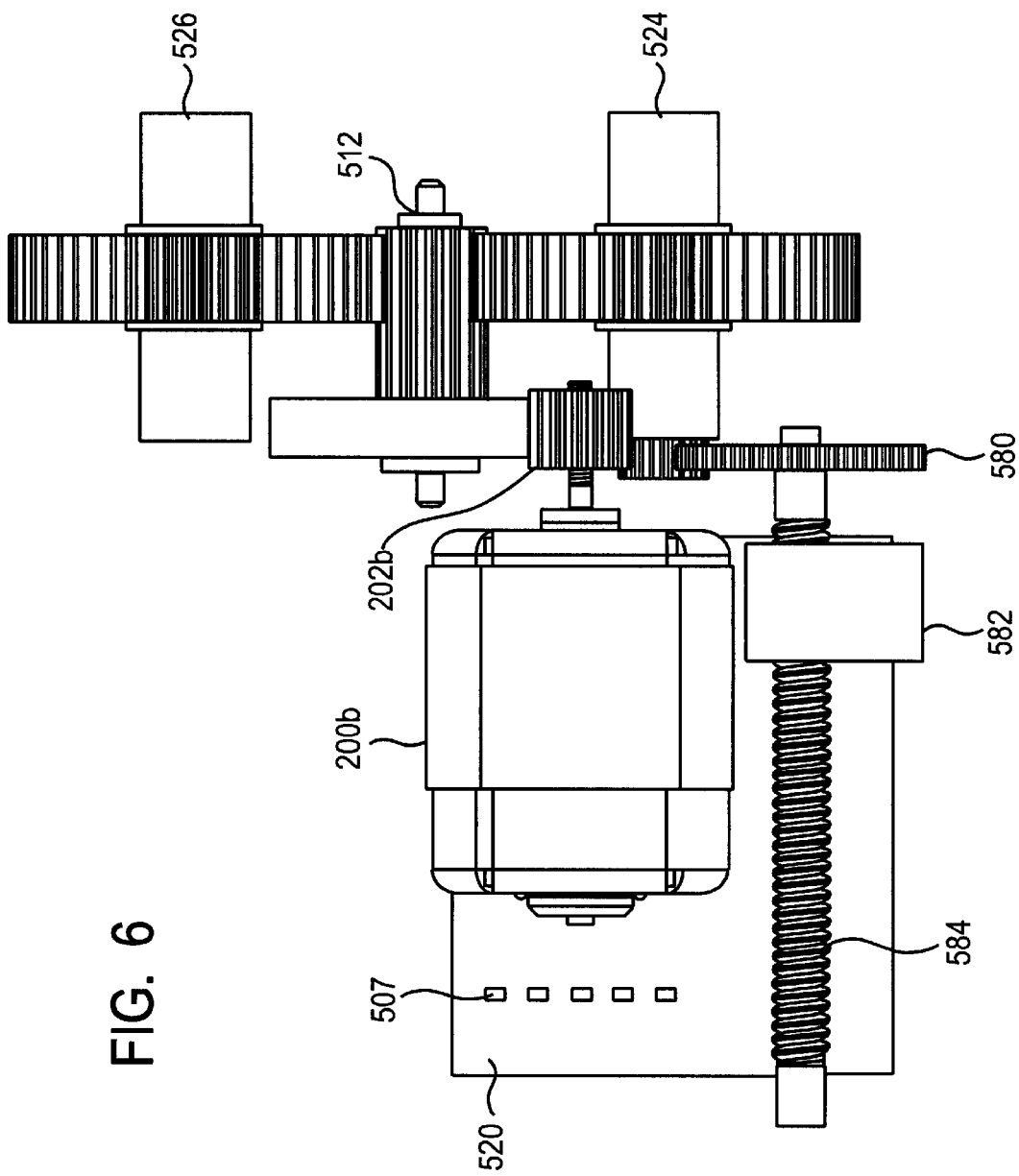
FIG. 6 is a top view of the actuator shown in FIG. 5.
Figure 7:
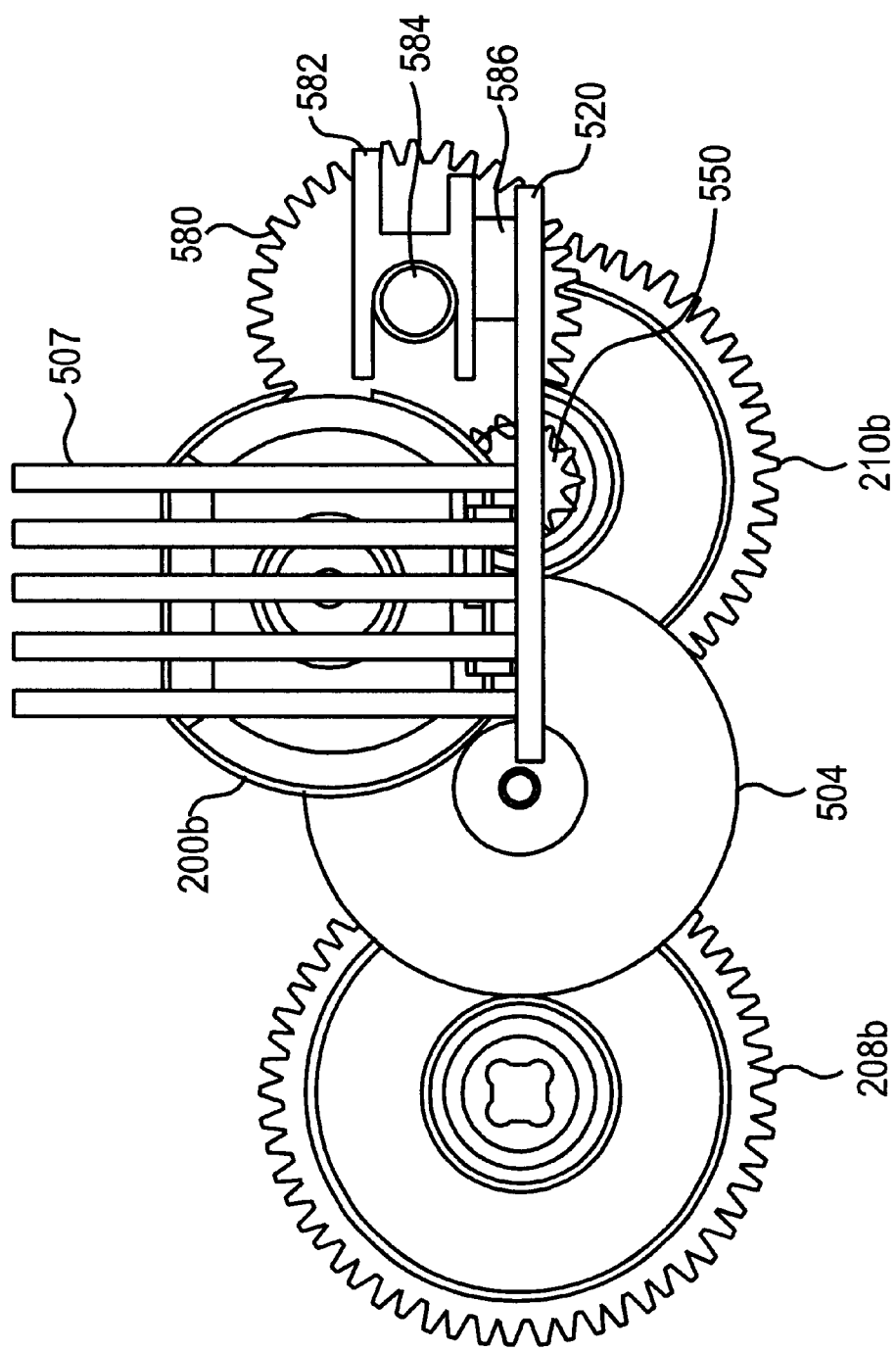
FIG. 7 is an end view of the actuator shown in FIG. 5.
Figure 8:
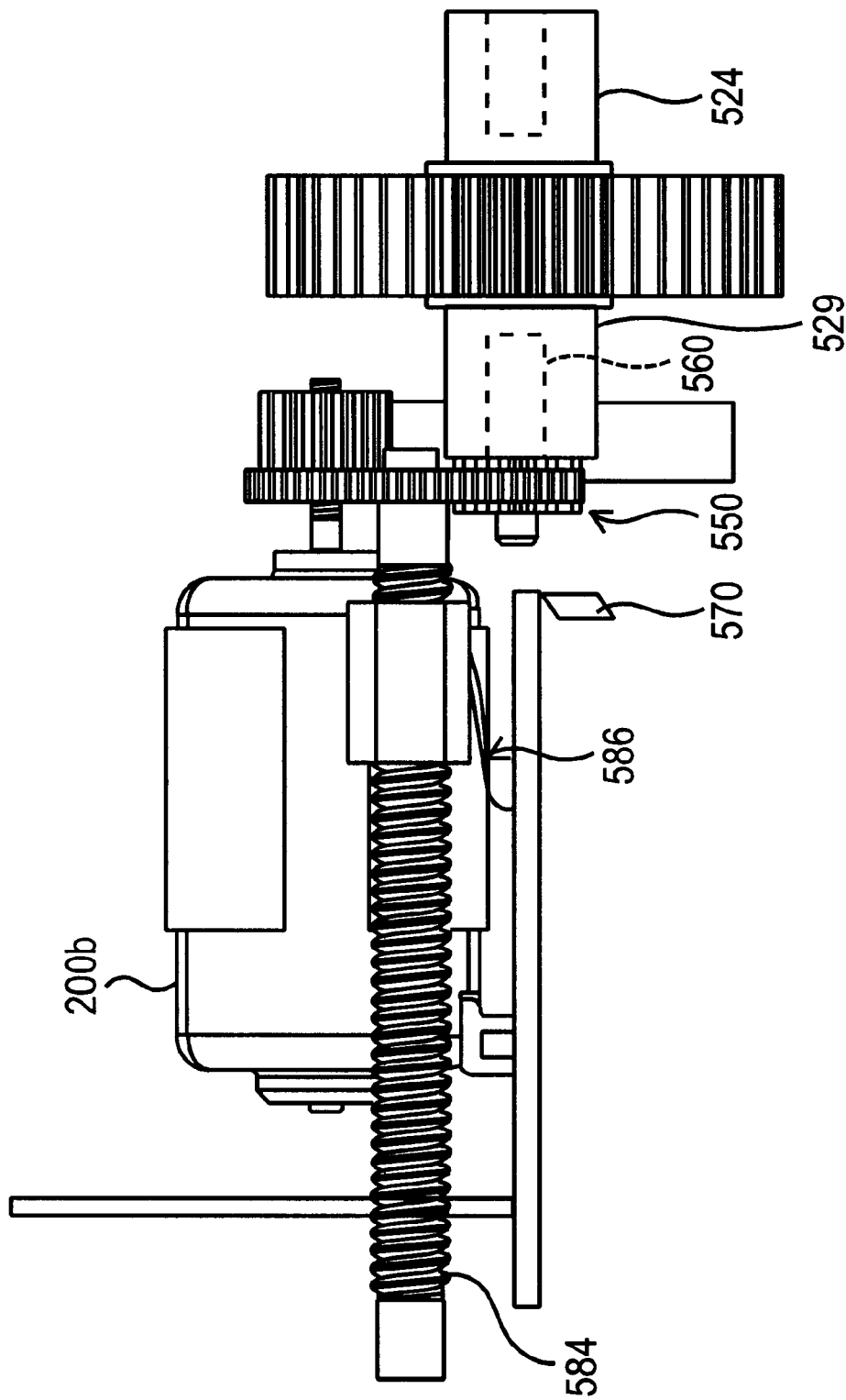
FIG. 8 is a side view of the actuator shown in FIG. 5.
Figure 17:
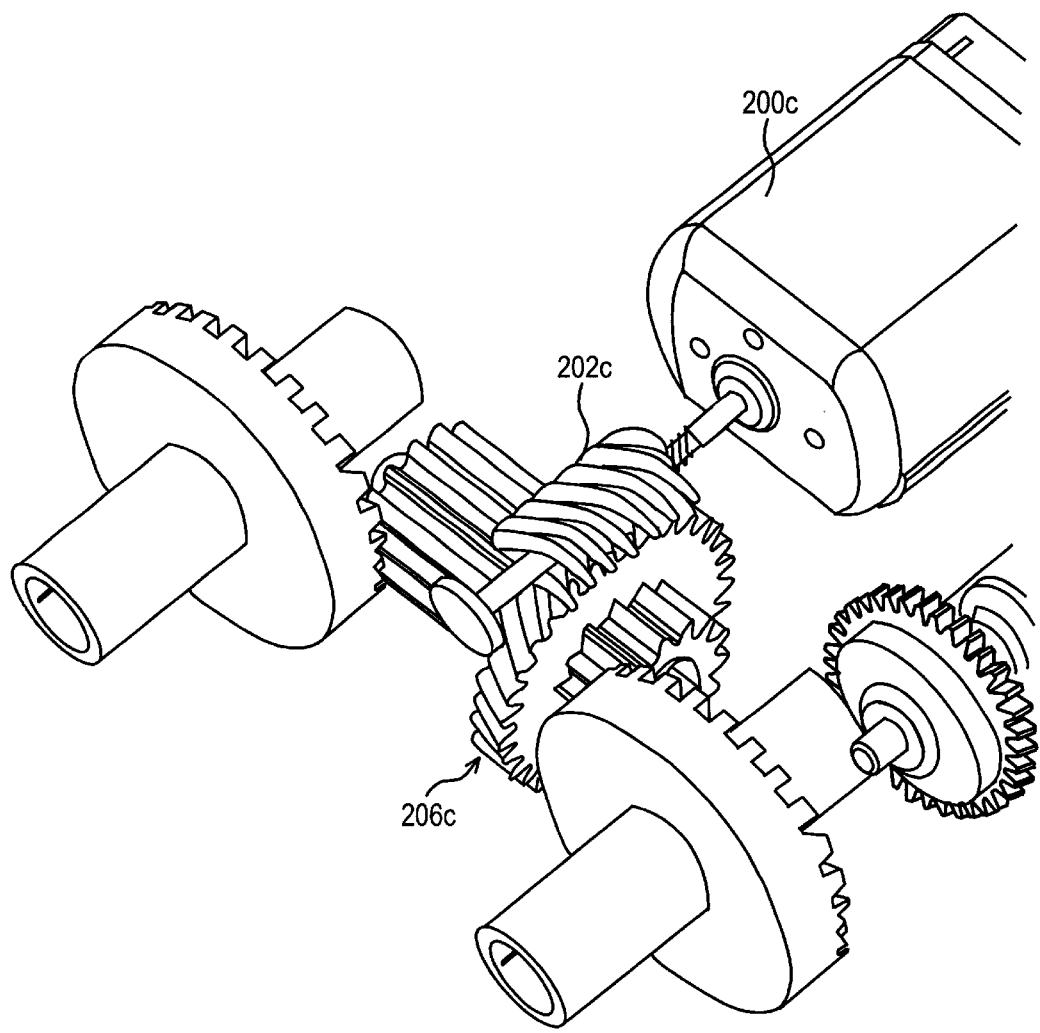
FIG. 17 is a perspective view of an actuator consistent with the invention having a worm gear and worm wheel for noise reduction benefits.

Turning now to FIGS. 17–21, various configurations consistent with the invention for reducing audible noise of an electromechanical actuator are illustrated. Audible noise has become a significant attribute of electro-mechanically actuated systems in passenger vehicles. Typically, it is desirable to reduce the audible noise in the cabin of a passenger vehicle. One exemplary manner of reducing audible noise consistent with the invention is by gear train selection. For example, by replacing motor pinion gear 202a, 206a and compound gear 202b, 206b as illustrated in FIGS. 3 and 5, with a worm gear 202c and a worm wheel 206c as illustrated in FIG. 17, a significant reduction in audible noise can be achieved.

Figure 18:
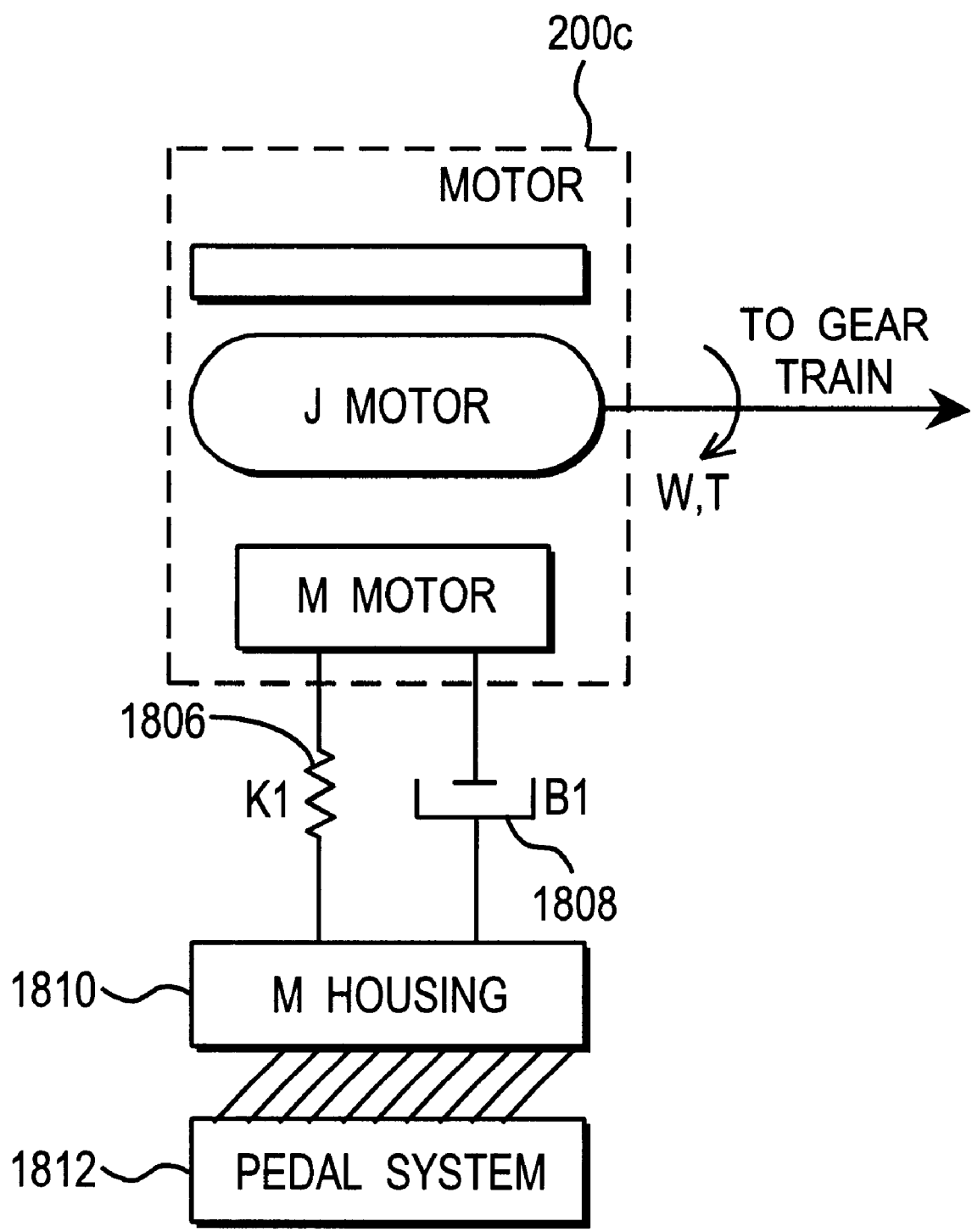
FIG. 18 is a block diagram illustrating the benefits of isolating a motor in an actuator consistent with the present invention.

Another method of reducing audible noise consistent with the invention includes isolation of components and sub-components of an actuator. FIG. 18 is block diagram illustrating motor isolation consistent with the invention. A motor 206c having a certain mass and energy may be coupled to an isolator, e.g., a pair of isolation bushings on either side of the motor. The isolator has an effective spring constant 1806 and damping-constant 1808, both of which may be varied depending on the type of material and geometry chosen for the isolator. The isolator thus mechanically isolates the motor from the mass of the actuator housing 1810, thereby reducing air born audible noise associated with motor vibration.

Figure 19:
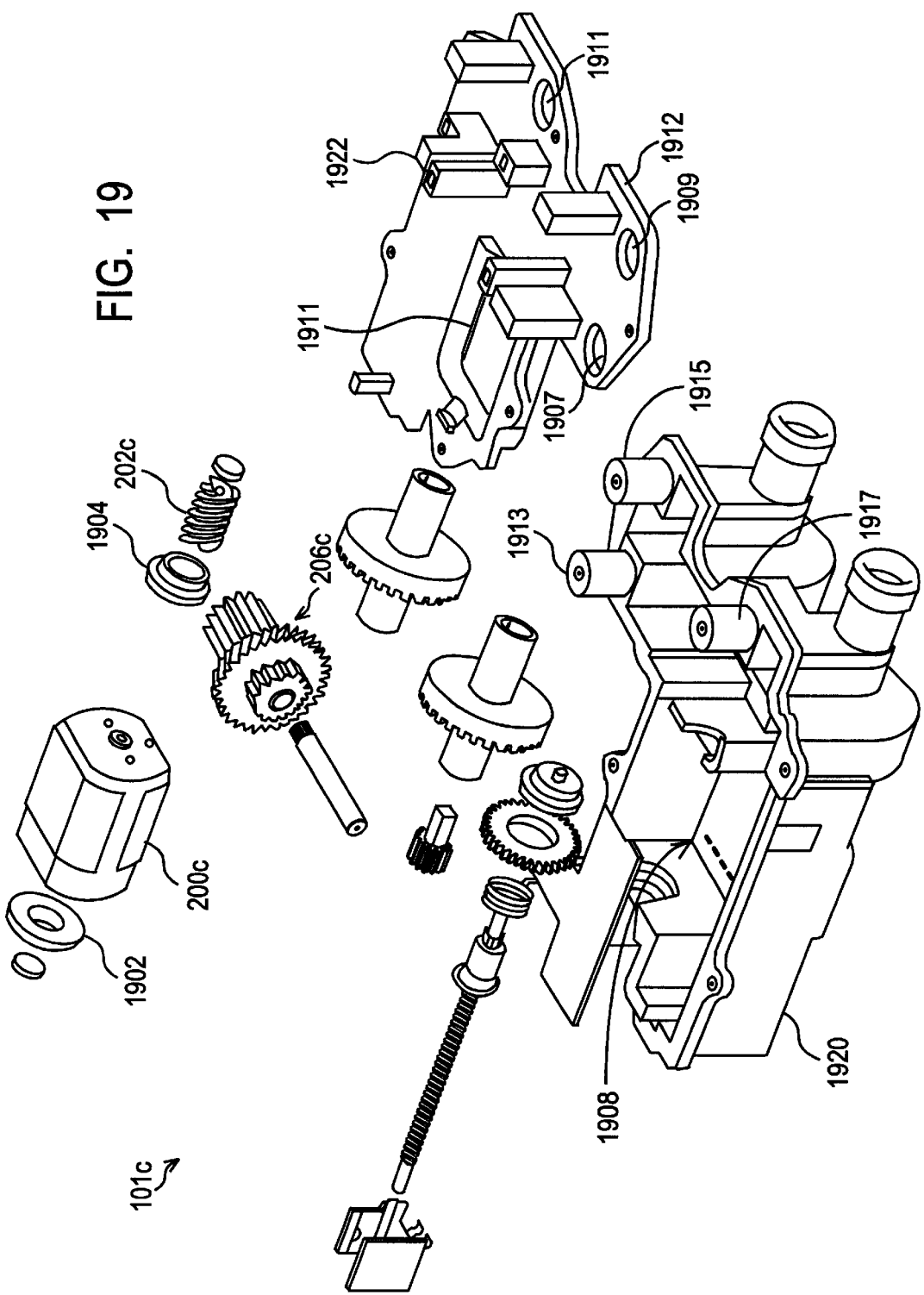
FIG. 19 is an exploded perspective view of one embodiment of a motor isolation assembly in an actuator consistent with the present invention.

Turning to FIG. 19, one exemplary embodiment of a motor isolation assembly in an actuator 101c consistent with the present invention is illustrated. In the illustrated embodiment, first 1920 and second 1912 housing portions are configured to define a motor isolation cavity. A portion 1908 of the cavity is defined by the first housing portion 1920, and a cover to the cavity is provided by the second portion 1912 when the second portion is placed over the first portion with projections 1913, 1915, and 1917 received in openings 1907, 1909, 1911, respectively. In the illustrated embodiment, the second portion 1912 includes a recessed portion 1911 for receiving the motor, and projection 1922 on the second portion 1912 close the motor cavity internally. A first isolation bushing 1902 and a second isolation busing 1904 are provided at associated sides the motor 200c. The isolation bushings 1902, 1904 and the mating first and second housing portions effectively isolate the motor 200c in the motor cavity from the remainder of actuator components, thereby reducing associated audible noise. Advantageously, the audible noise may be adjusted by selection of the isolation bushing material to provide appropriate spring and damping constants.

Figure 20:
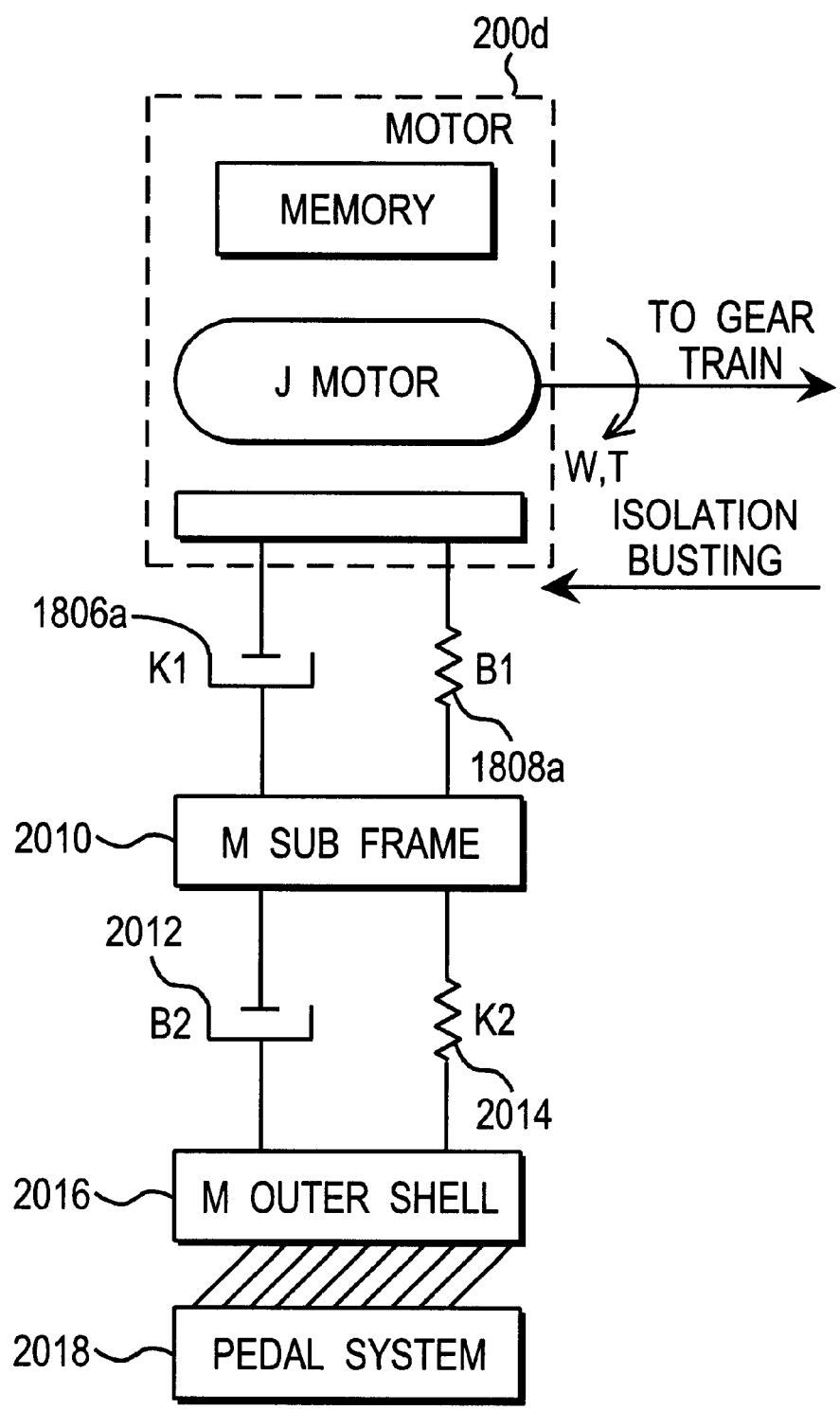
FIG. 20 is a block diagram illustrating the benefits of isolating a motor and a sub-frame within an actuator consistent with the present invention.

In another embodiment, internal actuator components may be housed in a sub-frame. The sub-frame may then be isolated from the actuator housing for additional noise reduction benefits. FIG. 20 is a block diagram illustrating an exemplary sub-frame configuration consistent with the invention. Again a motor 200d having a certain mass and energy may be coupled to a motor isolator or isolators, e.g., pair of isolation bushing on either side of the motor. The motor isolator has an effective spring constant 1806a and damping constant 1808a, both of which may be varied depending on the type of material and geometry chosen for the motor isolator.

In this instance, the motor 200d is isolated from the mass of the sub-frame 2010. The mass of the sub-frame 2010 may be chosen to minimize transfer of vibration by adjusting the volume and material density. In turn, the sub-frame is coupled-to the mass of the outer shell 2016 of an actuator-consistent with the invention. Similar to the motor isolator, the sub-frame isolator or isolators have an effective spring constant 2012 and damping constant 2014 isolating the sub-frame from the outer shell of the actuator. The effective spring constant 1806a and damping constant 1808a for the sub-frame isolator can be tailored by selection of an appropriate material and geometry for the isolator.

Figure 21:
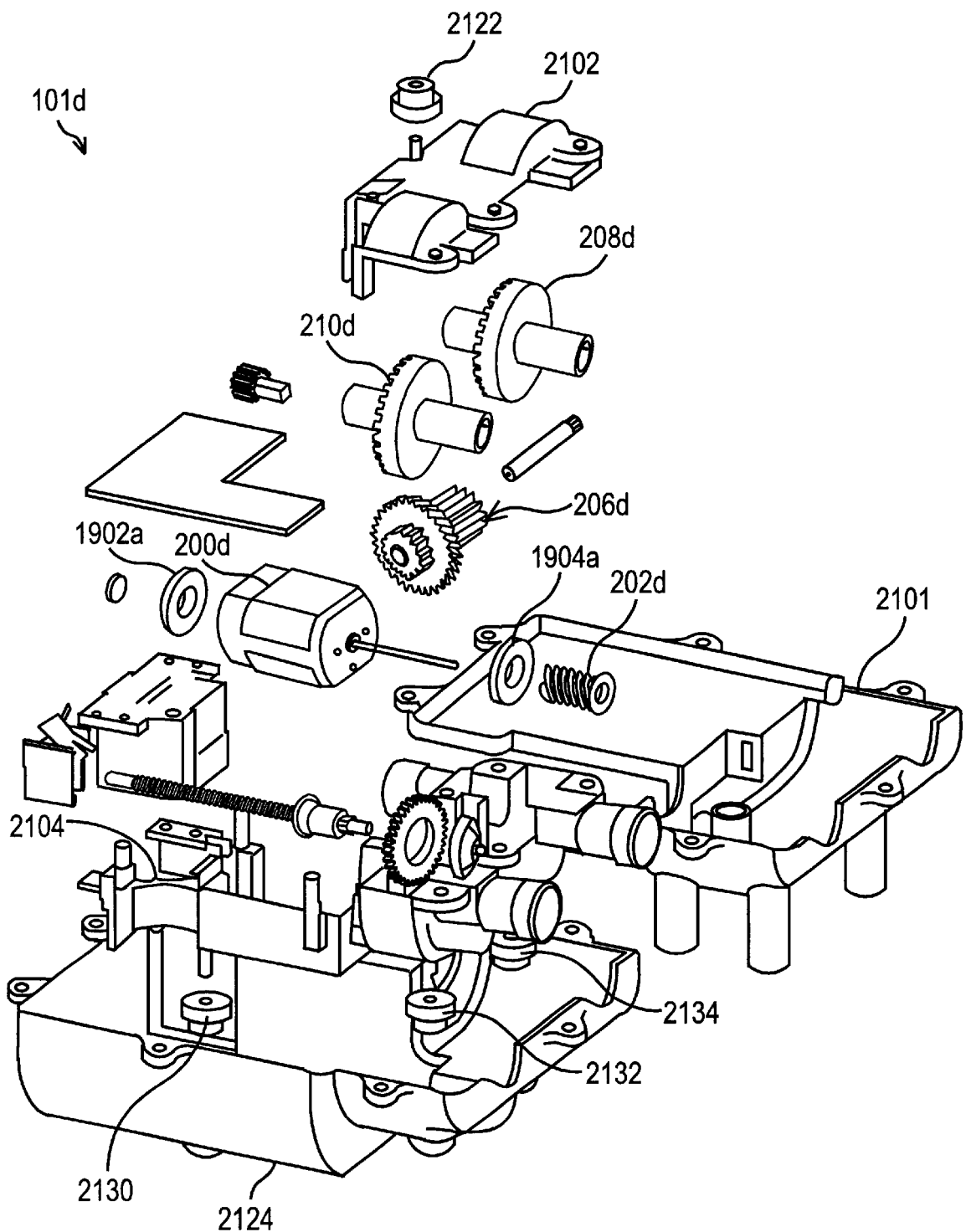
FIG. 21 is an exploded perspective view of one embodiment of a sub-frame assembly within an actuator consistent with the present invention.

Turning to FIG. 21, an exploded view of an exemplary actuator 101d including a motor and sub-frame isolation assembly consistent with the present invention is provided. The sub-frame includes a sub-frame top portion 2102 and sub-frame lower portion 2104. Mating of the top and lower portions of the sub-frame encloses the actuator components, and isolates the motor in a separate sub-frame cavity through first 1902a and second 1904a isolation bushings. Again, the bushings may be formed from materials chosen to provide desired spring and damping constants for reducing noise. The sub-frame may enclose the worm gear 202d, the worm wheel 206d, output gears 208d and 210d and associated parts, and any elements related to position sensing. The sub-frame may be constructed from a variety of materials to assist with audible noise reduction. For instance, the sub-frame top portion 2102 may be a low-density material, e.g., a plastic, and the subframe lower portion 2104 may be a higher density material, e.g., zinc.

A main portion 2124 and a cover portion 2101 of the actuator housing mate to enclose the sub-frame. In the illustrated embodiment, the sub-frame top portion 2102 is isolated from the actuator housing cover 2101 by isolator 2122. In addition, the sub-frame lower portion 2104 is isolated from the main housing portion 2124 by a plurality of isolators 2130, 2132, and 2134. The isolators 2130, 2132, 2134 may include central openings for accepting associated protrusions on the sub-frame lower portion which extend into corresponding openings in the main housing 2124 portion of the actuator. The isolators or grommets 2122, 2130, 2132, and 2134 may, for example, be elastomeric for achieving a desired spring and damping constant.

The motor 200d is thus isolated from the sub-frame by bushings 1902a and 1904a, and all actuator components, including the motor, are isolated from the outer actuator housing by the sub-frame and the isolators. Advantageously, when the actuator housing is affixed to another system, such as an adjustable pedal system, the actuator components are mechanically isolated in the sub-frame. This provides a benefit to vehicle manufacturers as mechanical vibration transmission to the mating assembly is minimized. Also, adjustment of the spring and damping constants associated with the bushings and isolators, and adjustment of the sub-frame and actuator housing materials, allows for tuning of the audible noise associated with the actuator for a particular application.

Thus, the embodiments that have been described herein are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. An electromechanical actuator comprising:
   a motor having a drive shaft;
   a drive shaft gear coupled to said drive shaft;
   a compound gear in meshing engagement with said drive shaft gear;
   a plurality of output gears in meshing engagement with said compound gear;
   a plurality of output ports associated with said plurality of output gears for providing a plurality of mechanical outputs from said actuator; and
   at least one sensor configured to provide an output representative of a number of rotations of an associated one of said output gears.

2. The actuator of claim 1, wherein said sensor is selected from the group consisting of a non-contact pulse counting position sensor, a non-contact analog sensor, and a contact analog sensor.

3. The actuator of claim 1, wherein said actuator further comprises a printed circuit board and a microcontroller embedded in said printed circuit board, wherein said sensor is a non-contact sensor, wherein said microcontroller is programmable based on a gear ratio of said actuator.

4. An adjustable pedal system for adjusting the position of a plurality of pedals in a passenger vehicle comprising:
   a vehicle power source;
   an electromechanical actuator coupled to said vehicle power source, said actuator comprising:
      a motor having a drive shaft;
      a drive shaft gear coupled to said drive shaft;
      a compound gear in meshing engagement with said drive shaft gear;
      a plurality of output gears in meshing engagement with said compound gear and;
      a plurality of output ports associated with said plurality of output gears for providing a plurality of mechanical outputs from said actuator, wherein each one of said plurality of mechanical output ports is configured to drive an associated one of said plurality of pedals.

5. The system of claim 4, wherein said drive shaft gear comprises a worm gear and said compound gear comprises a worm wheel.

6. The system of claim 4, wherein said drive shaft gear comprises a pinion gear and said compound gear comprises a spur gear.

7. The system of claim 4, wherein said plurality of output gears comprises a first output gear and a second output gear, and said plurality of mechanical output ports comprises a first output port and second output port, said first output gear coupled to said first output port, and said second output gear coupled to said second output port.

8. The system of claim 7, wherein said plurality of output ports comprises a third output port, and wherein said second output gear is coupled to said second output port and said third output port.

9. The system of claim 4, further comprising a sensor for sensing the position of said plurality of pedals relative a predetermined fixed location.

10. The system of claim 9, wherein said sensor is automatically calibrated to said position of said plurality of pedals within one full actuation travel of said plurality of pedals.

11. The system of claim 9, wherein said sensor is selected from the group consisting of a non-contact pulse counting position sensor, a non-contact analog sensor, and a contact analog sensor.

12. The system of claim 9 wherein said sensor comprises a non-contact sensor, said non-contact sensor comprising: a magnet coupled to a rotating member of said actuator; a magnetic sensing circuit responsive to rotating movement of said magnet and configured to provide a digital pulse output associated with said rotating movement; a microcontroller configured to receive said digital pulses and determine a position for said plurality of pedals based on said digital pulses.

13. The system of claim 12, wherein said microcontroller is programmable for taking into account varying gear ratios for said actuator.

14. The system of claim 12, wherein said magnet is coupled to said output shaft of said motor, and said magnetic sensing circuit comprising a Hall Effect Switch, and wherein said magnetic sensing circuit and said microcontroller are embedded in a printed circuit board.

15. The system of claim 12, wherein said non-contact sensor comprises a non-contact analog senor, said non-contact analog sensor comprising a conversion circuit configured to accept a digital signal from said microcontroller indicative of said position of said plurality of pedals and convert said digital signal to an analog signal.

16. The system of claim 15, wherein said digital signal is a pulse width modulation signal and said analog signal is a voltage signal.

17. An electromechanical actuator comprising:
a component isolator having a spring constant and damping constant, said isolator coupled to at least one component of said actuator for isolating said component from a remainder of said actuator, wherein said component comprises a motor and said component isolator comprises a first isolator portion and a second isolator portion, said first isolator portion coupled to a first end of said motor and said second isolator portion coupled to a second end of said motor.

18. The actuator of claim 17, wherein said first and second isolator portions comprise elastomeric material.

19. The actuator of claim 17, wherein said actuator further has a first housing portion and a second housing portion configured to define a motor isolation cavity for housing and isolating said motor.

20. An electromechanical actuator comprising:
an isolator having a spring constant and damping constant, said isolator coupled to a sub-frame for isolating said sub-frame from a housing of said actuator, wherein said sub-frame is configured to enclose a plurality of components of said actuator.

21. The actuator of claim 20, wherein said plurality of components comprises a motor, a drive gear, a compound gear, and output gears.

22. The actuator of claim 20, wherein said sub-frame has a top sub-frame housing portion and a bottom sub-frame housing portion, wherein said top sub-frame housing portion comprises a first material and said bottom sub-frame housing portion comprises a second material, said second material having a higher density than said first material.

23. The actuator of claim 22, wherein said high density material comprises zinc.

24. The actuator of claim 22, wherein said low density material is comprises plastic.

25. The actuator of claim 20, wherein said sub-frame has a top sub-frame housing portion and a bottom sub-frame housing portion, wherein said isolator comprises a plurality of isolator portions wherein at least a first isolator portion is coupled to said top sub-frame housing to isolate said top sub-frame housing from a top housing of said actuator, and at least a second isolator portion is coupled to said bottom sub-frame housing portion to isolate said bottom sub-frame housing portion from a bottom housing of said actuator.

26. An electromechanical actuator comprising:
a component isolator having a first spring constant and first damping constant, said component isolator coupled to at least one component of said actuator for isolating said component from a remainder of said actuator; and
a sub-frame isolator having a second spring constant and second damping constant, said sub-frame isolator coupled to a sub-frame integral to a housing of said actuator, wherein said sub-frame encloses at least said component.

27. The actuator of claim 26, wherein said component comprises a motor.

28. The actuator of claim 27, wherein said component isolator comprises a first component isolator portion and a second component isolator portion, said first component isolator portion coupled to a first end of said motor and said second isolator portion coupled to a second end of said motor.

29. The actuator of claim 28, wherein said first and second component isolators comprise an elastomeric material.

30. The actuator of claim 26, wherein said sub-frame further has a first sub-frame housing portion and a second sub-frame housing portion to define a motor isolation cavity for housing and isolating said motor within said sub-frame.

31. The actuator of claim 26, wherein said sub-frame has a top sub-frame housing portion and a bottom sub-frame housing portion, wherein said top sub-frame housing portion comprises a first material and said bottom sub-frame housing portion comprises a second material said second material having a density higher than said first material.

32. The actuator of claim 31, wherein said high density material comprises zinc.

33. The actuator of claim 32, wherein said sub-frame has a top sub-frame housing portion and a bottom sub-frame housing portion, wherein said sub-frame isolator comprises a plurality of sub-frame isolator portions wherein at least a first sub-frame isolator portion is coupled to said top sub-frame housing to isolate said top sub-frame housing from a top housing of said actuator, and at least a second sub-frame isolator portion is coupled to said bottom sub-frame housing portion to isolate said bottom sub-frame housing portion from a bottom housing of said actuator.

34. An adjustable pedal system for adjusting the position of a plurality of pedals in a passenger vehicle comprising:

a vehicle power source;
an electromechanical actuator coupled to said vehicle power source, said actuator comprising:
a motor having a drive shaft;
a drive shaft gear coupled to said drive shaft;
a compound gear in meshing engagement with said drive shaft gear;
a plurality of output gears comprising at least a first output gear and a second output gear in meshing engagement with said compound gear, wherein said first output gear and said second output gear have different gear ratios; and
a plurality of output ports associated with said plurality of output gears for providing a plurality of mechanical outputs from said actuator, wherein each one of said plurality of mechanical output ports is configured to drive an associated one of said plurality of pedals, wherein pedals associated with said first output gear are driven at a rate different than pedals associated with said second output gear.

35. The system of claim 34, wherein said first output gear drives a brake pedal and said second output gear drives an accelerator pedal at relative rates based on said difference in output gear ratios to maintain a step over distance between said brake pedal and said accelerator pedal regardless of a position of said pedals.

36. An adjustable pedal system for adjusting the position of a plurality of pedals in a passenger vehicle comprising:
a vehicle power source; and
an electromechanical actuator coupled to said vehicle power source, said actuator comprising:
a motor having a drive shaft, and
a gear train coupled to said drive shaft, said gear train comprising a plurality of output gears, each of said output gears being coupled to an associated one of a plurality of output ports, wherein each of said plurality of output ports is coupled to an associated one of said plurality of pedals.

37. The system of claim 36, wherein a first one of said output ports is coupled to a first one of said pedals for driving said first pedal at a first rate and a second one of said output ports is coupled to a second one of said pedals for driving said second pedal at a second rate different from said first rate.

38. The system of claim 37, wherein said first pedal is a brake pedal and said second pedal is an accelerator pedal.

39. The system of claim 38, wherein said first and second rates are selected to maintain a predetermined step over distance between said brake pedal and said accelerator pedal.

40. The system of claim 36, further comprising at least one position sensor for sensing a position of at least one of said plurality of pedals relative a predetermined fixed location.

41. The system of claim 40, wherein said position sensor is selected from the group consisting of a non-contact pulse counting position sensor, a non-contact analog sensor, and a contact analog sensor.

42. The system of claim 40, wherein said position sensor is a non-contact sensor, said non-contact sensor comprising: a magnet coupled to a rotating member of said actuator; a magnetic sensing circuit responsive to rotating movement of said magnet and configured to provide a digital pulse output associated with said rotating movement; a microcontroller configured to receive said digital pulses and determine a position for said at least one of said plurality of pedals based on said digital pulses.

43. The system of claim 42, wherein said microcontroller is programmable.

44. The system of claim 42, wherein said magnet is coupled to said output shaft of said motor, and said magnetic sensing circuit comprises a Hall Effect Switch, and wherein said magnetic sensing circuit and said microcontroller are on a circuit board.

45. The system of claim 40, wherein said sensor is a non-contact analog senor, said non-contact analog sensor comprising a conversion circuit configured to accept a digital signal from said microcontroller indicative of said position of said plurality of pedals and convert said digital signal to an analog signal.

46. The system of claim 45, wherein said digital signal is a pulse width modulation signal and said analog signal is a voltage signal.

* * * * *

UNITED STATES PATENT AND TRADEMARK OFFICE
CERTIFICATE OF CORRECTION

PATENT NO.   : 6,736,233 B2
DATED        : May 18, 2004
INVENTOR(S)  : Beishline et al.

It is certified that error appears in the above-identified patent and that said Letters Patent is hereby corrected as shown below:

Column 13,
Line 20, after the number "9", insert -- , --;

Column 14,
Line 52, after the word "material", insert -- ; --;
Line 56, delete the number "32" and insert the number -- 31 --;

Column 16,
Line 32, after the word "said", add the word -- non-contact --;

Signed and Sealed this

Twenty-sixth Day of July, 2005

JON W. DUDAS
*Director of the United States Patent and Trademark Office*